(12) United States Patent
Hoth et al.

(10) Patent No.: US 7,099,887 B2
(45) Date of Patent: Aug. 29, 2006

(54) HIERARCHICAL ENVIRONMENTS SUPPORTING RELATIONAL SCHEMAS

(75) Inventors: Robert A. Hoth, Rochester, MN (US); Richard C. Moss, Southsea (GB); James A. Walters, Byron, MN (US); Gary R. Moore, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 10/215,317

(22) Filed: Aug. 8, 2002

(65) Prior Publication Data

US 2004/0030716 A1 Feb. 12, 2004

(51) Int. Cl.
*G06F 17/30* (2006.01)
(52) U.S. Cl. .................................. 707/103 R
(58) Field of Classification Search .............. 707/1–10, 707/100–104.1, 200–205
See application file for complete search history.

(56) References Cited

U.S. PATENT DOCUMENTS

| | | | |
|---|---|---|---|
| 5,870,746 A * | 2/1999 | Knutson et al. ............ 707/101 |
| 5,974,407 A | 10/1999 | Sacks |
| 6,263,342 B1 * | 7/2001 | Chang et al. ............ 707/103 R |
| 6,578,046 B1 * | 6/2003 | Chang et al. .................. 707/10 |
| 2002/0174124 A1 * | 11/2002 | Haas et al. .................. 707/100 |
| 2003/0028551 A1 * | 2/2003 | Sutherland .................. 707/200 |

* cited by examiner

*Primary Examiner*—Diane D. Mizrahi
(74) *Attorney, Agent, or Firm*—Patterson & Sheridan, LLP

(57) ABSTRACT

A method, apparatus and article of manufacture for implementing a relational schema comprising at least one many-to-many relationship in a hierarchical database supporting one-to-many relationships, the relational schema being defined by a plurality of entities including at least one first entity having N components and at least one second entity having M components, the first and the second entity having a many-to-many relationship. One embodiment comprises creating a bridging table to transform the many-to-many relationship between the first and the second entities into a one-to-many relationship between the first entity and the bridging table and a one-to-many relationship between the bridging table and the second entity. For each mapping between one of the N components and one of the M components, an entry is created in the bridging table, the entry comprising a mapping between the one of the N components and the one of the M components.

29 Claims, 20 Drawing Sheets

| JOINING STRUCTURE |
| --- |
| PROFESSOR:COURSE; PROFESSOR > CLASS > COURSE |
| PROFESSOR:STUDENT; PROFESSOR > CLASS > ENROLL > STUDENT — 910 |
| PROFESSOR:ROOM; PROFESSOR > CLASS > ROOM |
| PROFESSOR:CLASS; PROFESSOR > CLASS |
| COURSE:STUDENT; COURSE > CLASS > ENROLL > STUDENT |
| COURSE:ROOM; COURSE > CLASS > ROOM |
| COURSE:PROFESSOR; COURSE > CLASS > PROFESSOR |
| COURSE:CLASS; COURSE > CLASS |
| STUDENT:ROOM; STUDENT > ENROLL > CLASS > ROOM |
| STUDENT:PROFESSOR; STUDENT > ENROLL > CLASS > PROFESSOR |
| STUDENT:COURSE; STUDENT > ENROLL > CLASS > COURSE |
| STUDENT:CLASS; STUDENT > ENROLL > CLASS |
| ROOM:PROFESSOR; ROOM > CLASS > PROFESSOR |
| ROOM:COURSE; ROOM > CLASS > COURSE |
| ROOM:STUDENT; ROOM > CLASS > ENROLL > STUDENT |
| ROOM:CLASS; ROOM > CLASS |
| CLASS:PROFESSOR; CLASS > PROFESSOR |
| CLASS:COURSE; CLASS > COURSE |
| CLASS:STUDENT; CLASS > ENROLL > STUDENT — 920 |
| CLASS:ROOM; CLASS > ROOM |

*Fig. 9*

UNTITLED
NAVIGATION FORM

GENERAL INFORMATION

ID: Nav_200

FORM INFORMATION

- FIELDS MARKED WITH AN ASTERISK "*" ARE REQUIRED.
- ON-LINE HELP TEXT IS PROVIDED FOR FIELDS THAT ARE UNDERLINED.

NAVIGATION INFORMATION

*Name:

NAVIGATION LINKS

By Applications / Contacts / Business Cards ← 1810
== Application A ====================

| | | |
|---|---|---|
| 00001 | ☐ | Application A, Geo=NA, Location=Anywhere |
| 00002 | ☐ | Application A Contacts |
| 00003 | ☐ | Andy_Anyone@ibm.com, 1800-000-0001 |
| 00004 | ☐ | Bob_Anyone@ibm.com, 1-800-000-0002 |
| 00005 | ☐ | Chris_Anyone@ibm.com, 1-800-000-0003 |
| 00006 | ☐ | Don_Anyone@ibm.com, 1-800-000-0004 |
| 00007 | ☐ | Ed_Anyone@ibm.com, 1-800-000-0005 |

⎫ 1820

↑ 1822

Comments:

*Fig. 18*

COURSE 2102

| crs ID | crs Name | crs Number | ... |
|---|---|---|---|
| 1 | COMPUTER SCIENCE II | 11 | ... |
| 2 | PHYSICS I | 12 | ... |
| 3 | ADVANCED ELECTRONICS III | 13 | ... |
| 4 | SYSTEM ARCHITECTURE I | 14 | ... |
| ... | ... | ... | ... |

ROOM 2104

| rm ID | rm Name | rm Building | rm Floor | rm Number | ... |
|---|---|---|---|---|---|
| 1 | MATH I | MPE | 12 | 1273 | ... |
| 2 | PHY I | MPE | 10 | 1051 | ... |
| 3 | COSI I | MPE | 14 | 1406 | ... |
| 4 | COSI II | MPE | 9 | 383 | ... |
| ... | ... | ... | ... | ... | ... |

*Fig. 21*
*(PRIOR ART)*

| CLASS 2260 | 2270 | 2280 | 2290 | 2292 | 2294 | 2296 |
|---|---|---|---|---|---|---|
| cls ID | cls Name | cls Section | prof ID | crs ID | rm ID | ... |
| 1 | CLASS A | IV | 1 | 1 | 3 | ... |
| 2 | CLASS B | IV | 2 | 3 | 1 | ... |
| 3 | CLASS C | IV | 1 | 1 | 3 | ... |
| 4 | CLASS D | IV | 1 | 4 | 4 | ... |
| 5 | CLASS E | IV | 2 | 2 | 2 | ... |
| ... | ... | ... | ... | ... | ... | ... |

*Fig. 22*
(PRIOR ART)

HIERARCHICAL ENVIRONMENTS SUPPORTING RELATIONAL SCHEMAS

BACKGROUND OF THE INVENTION

1. Field of the Invention

The present invention generally relates to accessing records documenting a business problem in document databases. More particularly, the present invention relates to implementing a relational schema between a plurality of interconnected entities in a hierarchical database.

2. Description of the Related Art

Databases are computerized information, storage and retrieval systems. Storing and retrieving data in a database is performed by means of a computer database management system (DBMS). Depending on how data is modeled by a database, different types of databases are differentiated.

The most prevalent type of database is the relational database, a tabular database in which data is defined so that it can be reorganized and accessed in a number of different ways. Data records in a relational database are maintained in tables, which are a collection of rows all having the same columns. Each row represents a data record and each column maintains information on a particular type of data for the data records that comprise the rows. Data records may be indexed using unique indices or keys that join different data records in different related tables together.

Another important type of database is the hierarchical database. The hierarchical database uses a hierarchical schema for storing information known as the parent/child model. A hierarchical schema may be represented as a tree structure, where each parent node may have a plurality of child nodes, while each child node may only have one parent node. Examples for hierarchical databases are IMS and Lotus Notes from International Business Machines of Armonk, N.Y.

Lotus Notes integrates a number of today's most important information sources that the user may seamlessly access on-line or off-line. Among others, Lotus Notes integrates an e-mail, calendaring, group scheduling, instant messaging, security, workflow, accessibility and cross split form capability. As a result of their diverse functionality, hierarchical databases such as, Lotus Notes, are widely spread and used by a large number of users, including a number of Fortune 500 companies.

A major disadvantage of hierarchical databases is that they are not suitable for implementing solutions to problems involving a relational schema. Consequently, users of hierarchical databases in general are required to use relational databases when trying to implement relational schemas.

Accordingly, there is a need to adapt hierarchical databases for use with relational schemas.

SUMMARY OF THE INVENTION

The present invention generally relates to a method, an apparatus and an article of manufacture for accessing records documenting a business problem in document databases. More particularly, the present invention relates to implementing a relational schema between a plurality of interconnected entities in a hierarchical database.

One embodiment provides a method of implementing a relational schema comprising at least one many-to-many relationship in a hierarchical database supporting one-to-many relationships, the relational schema being defined by a plurality of entities including at least one first entity having N components and at least one second entity having M components, the first and the second entity having a many-to-many relationship. The method comprises creating a bridging table to transform the many-to-many relationship between the first and the second entities into a one-to-many relationship between the first entity and the bridging table and a one-to-many relationship between the bridging table and the second entity. For each mapping between one of the N components and one of the M components, an entry is created in the bridging table, the entry comprising a mapping between the one of the N components and the one of the M components.

Another embodiment provides a method of describing interconnections between entities comprising at least one first entity having N components and at least one second entity having M components, each one of the N components being related to at least one of the M components. The method comprises creating a bridging structure for mapping the N components of the at least one first entity to the M components of the at least one second entity; and creating, using the bridging structure, a joining structure describing the interconnections between the entities.

Another embodiment provides a method of creating a database for documenting interconnections between a plurality of entities, each entity having at least one of a one-to-many relationship and a many-to-many relationship with another entity. The method comprises, for each entity of the plurality of entities, determining data describing the entity; creating a table using the determined data; and determining, whether the entity has a many-to-many relationship with another entity. The method comprises further, for each entity of the plurality of entities having a many-to-many relationship with another entity, creating a bridging table describing the many-to-many relationship with the other entity; creating, using the created tables and the bridging table, a joining table describing the interconnections between the plurality of entities; and creating, using the joining table, a plurality of retrieving components for retrieving data from the created tables.

Another embodiment provides a computer-readable medium containing a program which, when executed, performs an operation of implementing a relational schema comprising at least one many-to-many relationship in a hierarchical database supporting one-to-many relationships, the relational schema being defined by a plurality of entities including at least one first entity having N components and at least one second entity having M components, the first and the second entity having a many-to-many relationship. The operation comprises generating a bridging table to transform the many-to-many relationship between the first and the second entities into a one-to-many relationship between the first entity and the bridging table and a one-to-many relationship between the bridging table and the second entity. For each mapping between one of the N components and one of the M components, an entry is created in the bridging table, the entry comprising a mapping between the one of the N components and the one of the M components.

Another embodiment provides a computer-readable medium containing a program which, when executed, performs an operation of describing interconnections between entities comprising at least one first entity having N components and at least one second entity having M components, each one of the N components being related to at least one of the M components. The operation comprises generating a bridging structure for mapping the N components of the at least one first entity to the M components of the at least one second entity; and generating, using the bridging structure, a joining structure describing the interconnections between the entities.

Another embodiment provides a computer-readable medium containing a program which, when executed, performs an operation of providing a database for documenting a business problem involving a plurality of interconnected entities, each entity having at least one of a one-to-many relationship and a many-to-many relationship with another entity and at least one entity having a many-to-many relationship with another entity. The operation comprises, for each entity of the plurality of entities, receiving data describing the entity; generating a table using the received data; and determining, whether the entity has a many-to-many relationship with another entity. The operation comprises further, for each entity of the plurality of entities having a many-to-many relationship with another entity, generating a bridging table describing the many-to-many relationship with the other entity; generating, using the generated tables and the bridging table, a joining table describing the interconnections between the plurality of entities; and generating, using the joining table, a plurality of retrieving components for retrieving data from the generated tables.

Another embodiment provides a computer program product in a storage medium, the computer program product defining a documentation manager for managing a database documenting a business problem involving a plurality of interconnected entities, each entity having at least one of a one-to-many relationship and a many-to-many relationship with another entity. The documentation manager comprises a table creating unit for creating a table for each entity of the plurality of entities; a determining unit for determining, for each entity of the plurality of entities, whether the entity has a many-to-many relationship with another entity; and a generating unit for creating a bridging table for each entity of the plurality of entities having a many-to-many relationship with another entity, the bridging table for describing the many-to-many relationship with the other entity; and a joining table for describing the interconnections between the plurality of entities using the created tables and the bridging table. The documentation manager further comprises at least one retrieving component for retrieving data from the created tables using the joining table.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 9 is an illustration of an exemplary joining structure;

FIGS. 17–18 are screen shots of exemplary retrieving component graphical user interfaces;

FIGS. 20–22 are illustrations of tables implementing the university problem of FIG. 19 in a relational database according to the state-of-the-art.

DETAILED DESCRIPTION OF THE PREFERRED EMBODIMENTS

The present invention generally relates to a method, an apparatus and an article of manufacture for accessing records documenting a business problem in document databases.

Overview

A document database is an organized collection of information in which related collections of documents are stored. A document database comprises one or more databases, which contain document records. A document record is defined as an object containing text, graphics, video or audio objects or any other kind of "rich text" data.

A document database with an underlying hierarchical schema may be implemented using a hierarchical database, for instance, Lotus Notes from IBM. A document database implemented with Lotus Notes may contain document records comprising semi-structure records created through forms and fields. Forms are masks through which a user can view the data of a document record or create a document record and enter data. A field is an area on a form that contains a single type of information. The fields on a form define the type of information the documents can contain. The types of information may include: text, rich text, multiple choice list or keywords, numbers, times or dates, and user names. Rich text includes file attachments, binary objects, multi-font text, tabular data, worldwide web pages, and linked or imbedded objects. The documents records may be indexed and retrieved by any of the fields within a document records. Also, the document records may be indexed and retrieved by the actual contents of the document record.

Document records in a document database may be located and displayed by a user through views, folders and navigators. Views display document summary type fields in rows and columns for a user to find particular interest document records. Views may be programmed to group the information according to specific criteria. Folders display lists of document records for user selection. Navigators provide a graphical way for a user to find documents or take actions without having to maneuver through use of commands on a pull-down menu. Illustrative Navigators may include forward buttons, backward buttons and the like.

Commonly, document databases are part of a distributed system comprising a plurality of servers and clients, as in the case of the client-server model. Typically, the clients and server communicate via a local area network (LAN) or wide area network (WAN) using well-known protocols such as the transmission control protocol and Internet protocol (TCP/IP). The clients typically make requests through the server, which manages one or more databases. Once a response for the client's request is formulated, the response is provided to the client.

In the following, for purposes of illustration, the implementation of an exemplary business problem involving a plurality of interconnected entities having an underlying relational schema is described with respect to FIGS. 19–23.

Figure 19:
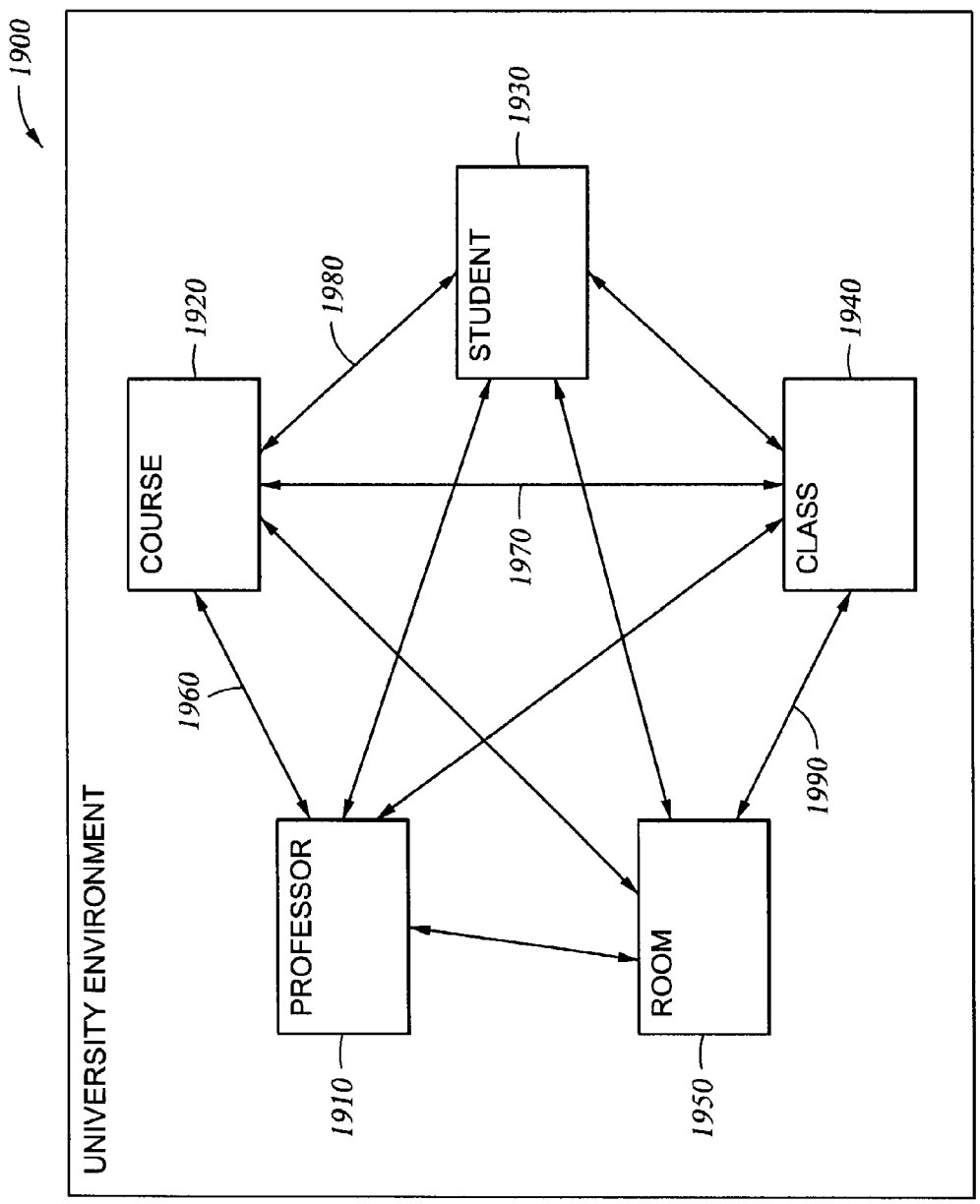
FIG. 19 is an illustration of a university problem according to the state-of-the-art.

FIG. 19 shows an exemplary university environment 1900, in which a plurality of entities 1910, 1920, 1930, 1940, 1950 representing professors, courses (i.e., subjects such as math, English, history, etc.), students, classes and rooms, respectively, are illustrated. The entities 1910, 1920, 1930, 1940, 1950 are involved in an exemplary business problem that consists of determining a classroom distribution for classes 1940. In the following description, for purposes of reference, this exemplary business problem will be referred to as the "university problem".

The entities 1910, 1920, 1930, 1940, 1950 are interconnected as shown by a plurality arrows in between the different entities, where each of the arrows represents a relationship between the interconnected entities. However, for purposes of simplicity and brevity only a part of the interconnections will be described in the following.

Arrow 1960 indicates that a professor 1910 may teach one or more courses 1920. Arrow 1970 indicates that the professor may teach a corresponding course 1920 before a class 1970 comprised of a plurality of students 1930. Arrow 1980 indicates that one or more students 1930 may choose a specific course 1920, thereby forming a class 1940. Arrow 1990 indicates, that for each class a corresponding room 1950 must be determined, so that the professor 1910 may teach the class 1940 in the corresponding room 1950 to the plurality of students 1930 making up the class.

Figure 20:
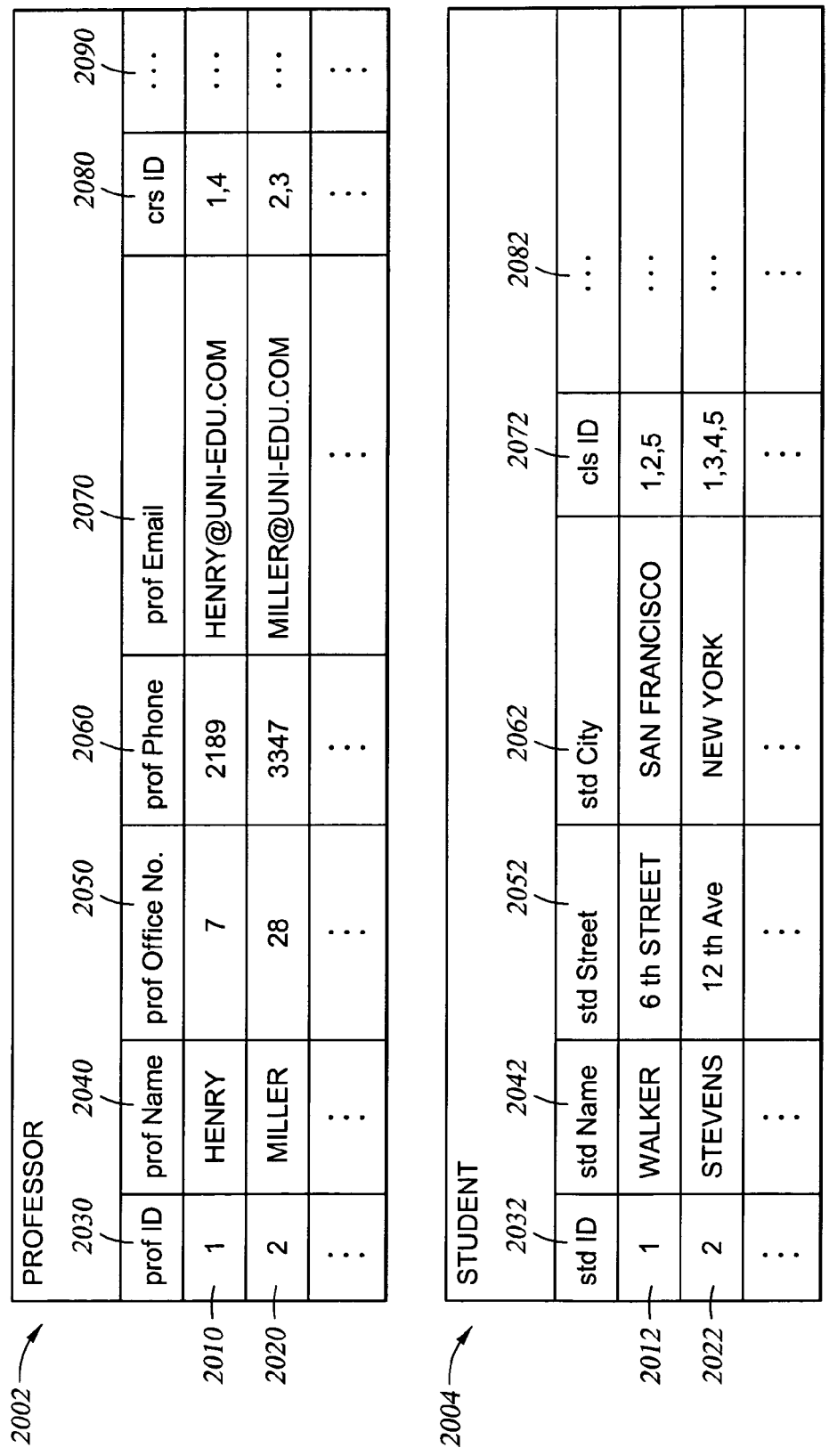

FIGS. 20–22 show, how the university problem may be solved using a relational database. Referring now to FIG. 20, tables 2002 and 2004 are shown. Table 2002 comprises information associated with the professors 1910 of FIG. 19 and table 2004 comprises information associated with the students 1930 of FIG. 19.

Table 2002 comprises a plurality of data records in form of rows, each row having identical columns. Table 2002 illustratively comprises two rows 2010 and 2020 associated with two different professors, namely Professor Henry and Professor Miller, respectively. Furthermore, table 2002 illustratively comprises a plurality of columns. Column 2030 relates to a unique identifier for uniquely identifying each data record of table 2002 relating to a corresponding professor. Column 2040 relates to the name of the corresponding professor. Column 2050 relates to the office number of the corresponding professor. Column 2060 relates to the phone number for the corresponding professor and column 2070 relates to the e-mail address of the corresponding professor. Column 2080 comprises the identifiers (ID's) of different courses that the corresponding professor teaches. Table 2002 may further comprise any additional columns having information relating to the corresponding professor, as shown in column 2090.

Table 2004 comprises a plurality of data records, each of which is associated with a specific student. Accordingly, data record 2012 is associated with a student named Walker and data record 2022 is associated with a student named Stevens. Table 2004 comprises a plurality of columns comprising information relating to the students. Column 2032 comprises a unique identifier uniquely identifying each data record associated with a specific student in table 2004. Column 2042 comprises names of the different students. Columns 2052 and 2062 comprise an indication of a location of residence of a specific student. Accordingly, column 2052 comprises a street indication and column 2062 comprises a city indication. Column 2072 comprises an indication of one or more classes, in which the student is enrolled. Column 2082 illustrates that a plurality of additional columns may be provided if desired or requested for providing additional information relating to a student.

FIG. 21 shows tables 2102 and 2104 comprising information relating to courses 1920 of FIG. 19 and rooms 1950 of FIG. 19. Table 2102 comprises a plurality of data records associated with different courses, each course being taught by a specific professor. Table 2102 illustratively comprises data records 2110, 2120, 2130 and 2140 illustrating four different courses. Table 2102 further comprises a plurality of columns, each of which comprises information relating to a specific course. Column 2150 relates to a unique identifier for uniquely identifying a corresponding course. Column 2160 relates to a name of the corresponding course and column 2170 relates to a number that externally identifies the corresponding course, as, for example, indicated in a brochure. Column 2180 illustrates that one or more additional columns may be introduced into table 2102 when desired or required for providing additional information relating to a course.

Table 2104 comprises a plurality of data records, each data record being associated with a specific room available in a building of the corresponding university. Table 2104 illustratively comprises data records 2112, 2122, 2132 and 2142 relating to four different classrooms. Table 2104 illustratively comprises a plurality of columns, each column providing information relating to a corresponding room. Column 2152 relates to unique identifiers, each of which uniquely identifies a corresponding classroom. Column 2162 relates to a name associated with the corresponding classroom. Column 2172 relates to an indication of the building in which the corresponding classroom is located. Column 2182 relates to a floor in the building in which the classroom is located, and column 2192 relates to a number that externally identifies the corresponding classroom, as indicated, for example, in a student brochure. Column 2194 is shown to illustrate that one or more additional columns may be included in 2104 if desired or required for providing additional information relating to a room.

FIG. 22 illustrates a table 2202 associated with a plurality of classes 1940 of FIG. 19. Table 2202 comprises a plurality of data records 2210, 2220, 2230, 2240 and 2250, each of which is associated with a specific class proposed in the university environment 1900 of FIG. 19. Table 2202 comprises a plurality of columns, each of which comprises information relating to a particular class. Column 2260 relates to a unique identifier for each class. Column 2270 relates to a name associated with a corresponding class. Column 2280 relates to a section associated with the corresponding class. Column 2290 relates to an identifier of a corresponding professor 1910 Of FIG. 19 teaching a corresponding class, the identifiers comprised in column 2290 being derived from the identifiers from column 2030 of table 2002 of FIG. 20. Column 2292 relates to identifiers of corresponding classes 1940 of FIG. 19 associated with the courses, the identifiers being derived from column 2150 of table 2102 of FIG. 21. Column 2294 relates to identifiers of rooms 1950 of FIG. 19, the identifiers being derived from column 2152 of table 2104 of FIG. 21. Column 2296 indicates that one or more columns may be added to table 2202 if desired or required for providing additional information relating to a particular class.

As can be seen from tables 2002 and 2004 of FIG. 20, 2102 and 2104 of FIGS. 21 and 2202 of FIG. 22, the interconnections between entities 1910, 1920, 1930, 1940 and 1950 of FIG. 19 define one-to-many and many-to-many relationships. Specifically, as can be seen from columns 2260 and 2290 of table 2202 of FIG. 22, there exists a one-to-many relationship between the professors and the classes. Accordingly, each professor may teach one or more classes, but each class is only associated with one specific professor. Furthermore, as can be seen from columns 2032 and 2072 of table 2004 of FIG. 20, there exists a many-to-many relationship between the students and the classes, as each student may attend one or more classes and each class may contain a plurality of students.

As can be seen from FIGS. 20–22, such a relational schema having one-to-many and many-to-many relationships may easily be implemented within a relational database, whereby each data needs to be included only once in one of the created tables. In contrast, a hierarchical database is not suitable for implementing a relational schema involving many-to-many relationships, as will be explained in the following with reference to FIG. 23.

Figure 23:
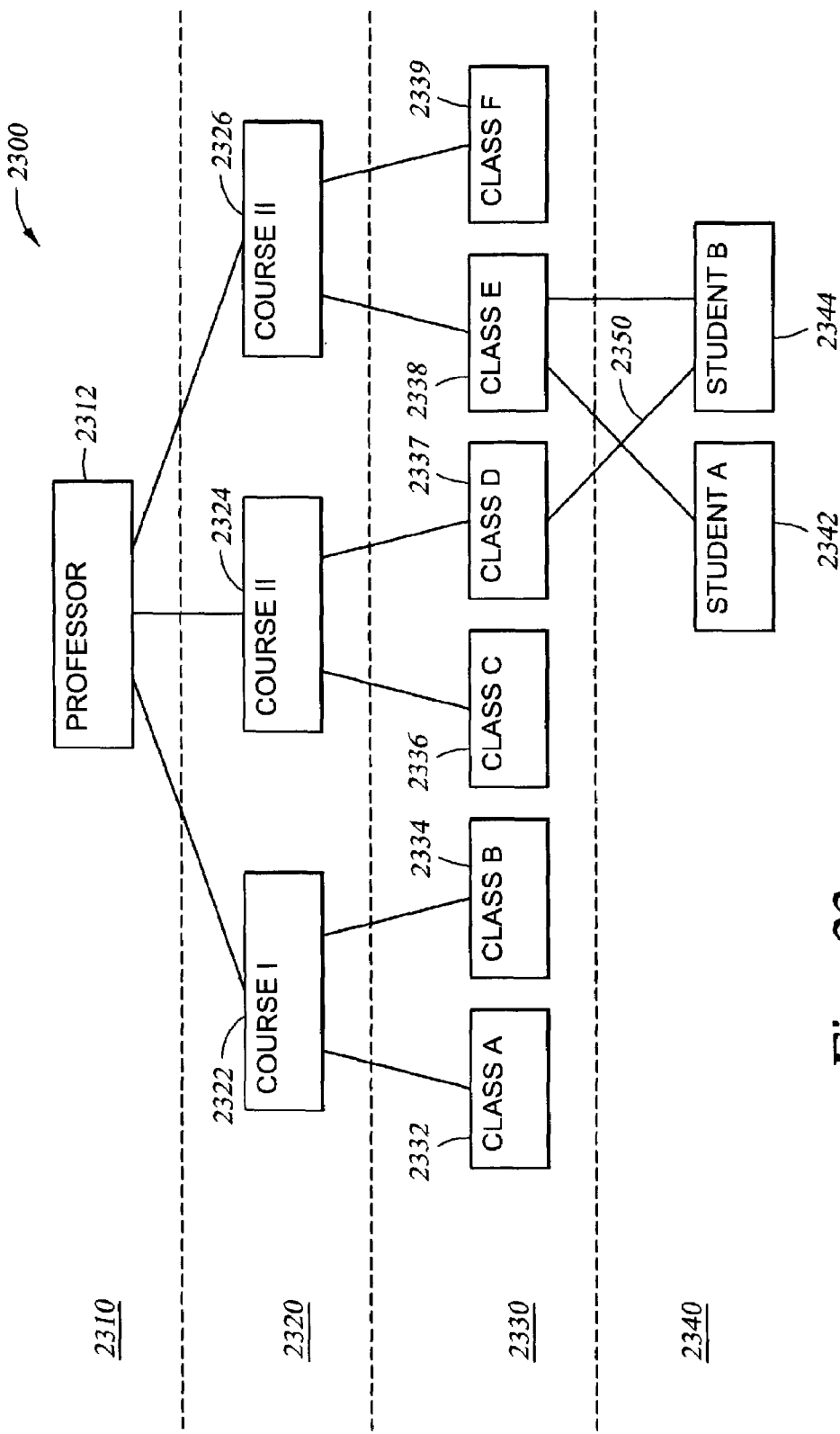
FIG. 23 is an illustration of a tree structure for implementing the university problem of FIG. 19 in a hierarchical database according to the state-of-the-art.

FIG. 23 shows a tree structure 2300 describing the interconnections of entities 1910, 1920, 1930, and 1940 of FIG. 19. Tree structure 2300 comprises four levels 2310, 2320, 2330 and 2340. Level 2310 comprises a parent node 2312 associated with a specific professor 1910 of FIG. 19. As indicated in table 2002 of FIG. 20, the professor 2312 may teach or propose a plurality of different courses, namely course I, II and III, referred to as 2322, 2324 and 2326 in level 2320. As indicated in table 2202 of FIG. 22, each course 2322, 2324 and 2326 can be taught within one or more classes, e.g., classes A, B, C, D, E and F, referred to as 2332, 2334, 2336, 2337, 2338 and 2339, respectively, comprised in level 2330. As can be seen from table 2004 of FIG. 20 and as illustratively indicated in FIG. 23, class "E" 2338 representing data record 2250 of FIG. 22 comprises students 1 and 2, referred to as 2342 and 2344, respectively, representing data records 2012 and 2022 of FIG. 20, respectively. As can further be seen from table 2004 of FIG. 20, student "2" 2344 associated with data record 2022 of FIG. 20 also attends class "D" 2337 associated with data record 2240 of FIG. 22.

However, in a hierarchical database each child node may only have one parent node. Thus, the described university problem may not be implemented within a common hierarchical database according to conventional methods. To address this problem, in the following, techniques for implementing a relational schema in a hierarchical database are described.

DETAILED DESCRIPTION OF THE PREFERRED EMBODIMENTS

One embodiment of the invention is implemented as a program product for use with a computer system such as, for example, the computing environment shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
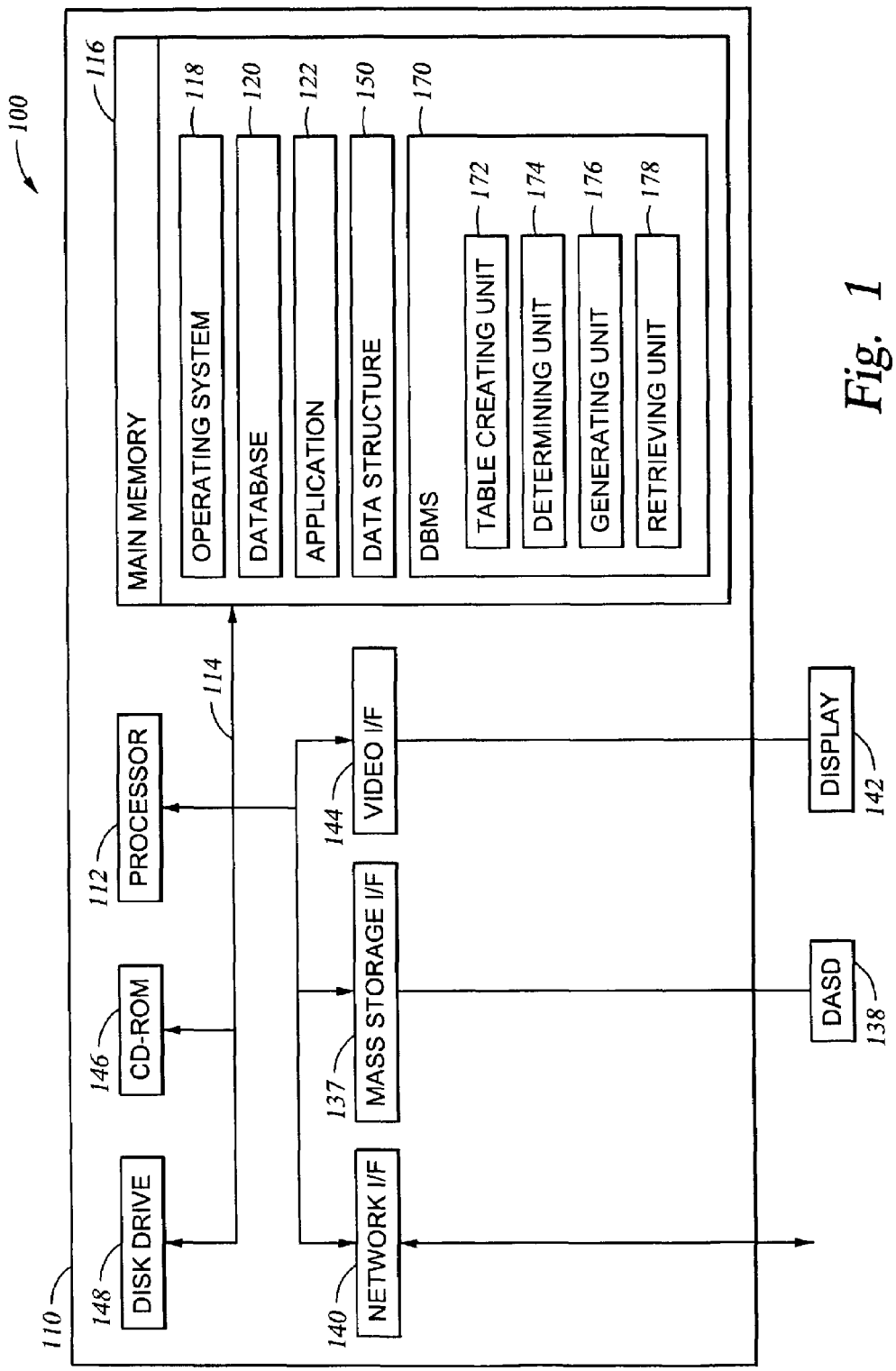
FIG. 1 is a high level diagram of a computing environment according to the invention.
Figure 2:
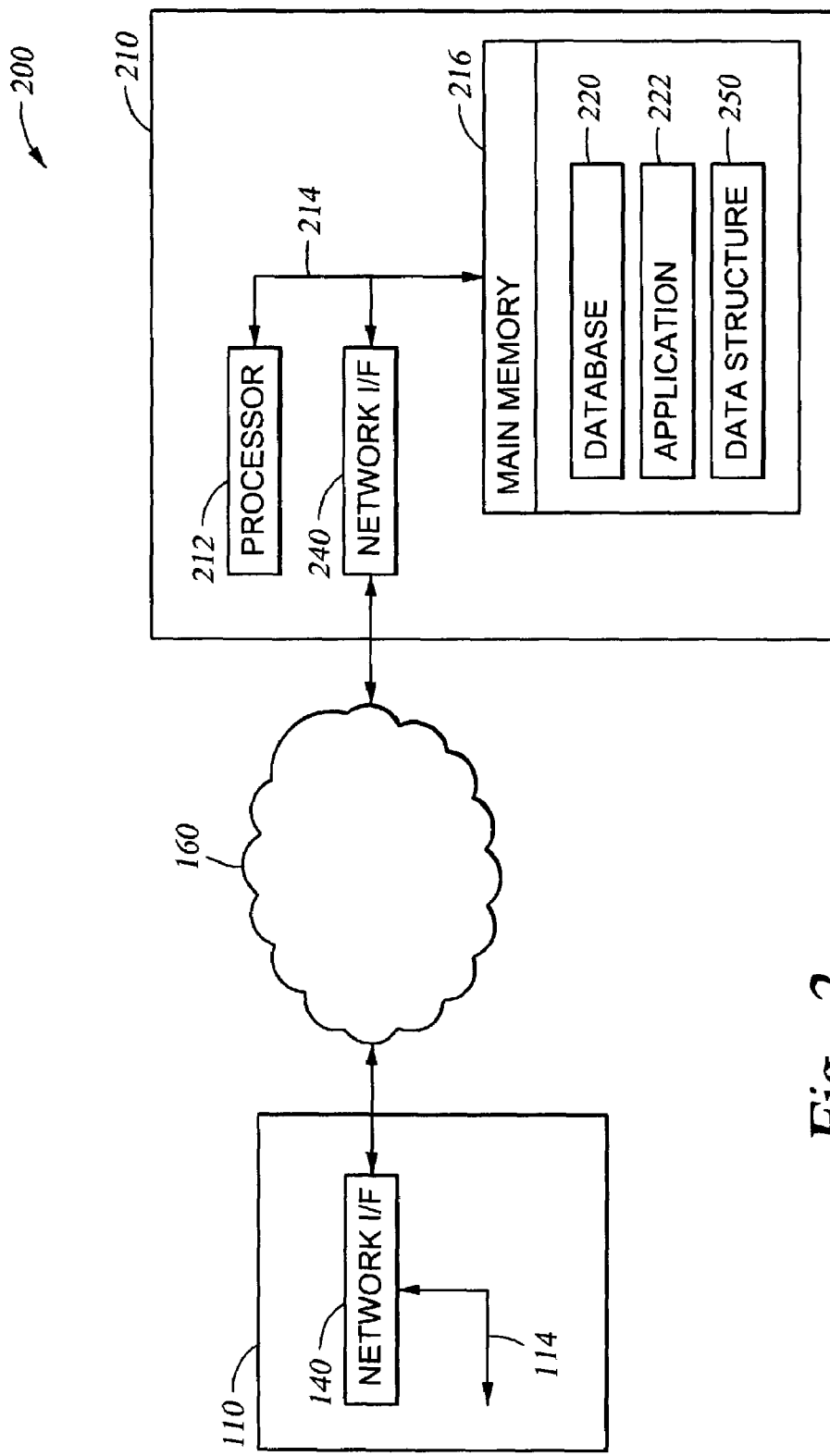
FIG. 2 is a high level diagram of a computing environment according to the invention.

Referring now to FIG. 1, a computing environment 100 comprising an illustrative computer system 110 according to one aspect of the present invention is shown. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, data structure, computer program product and computer-readable mediums of the invention. As shown in FIG. 2, the computer system 110 is part of a networked system. In this regard, the invention may be practiced in a distributed computing environment in which tasks are performed by remote processing devices that are linked through a communications network. In a distributed computing environment, program modules may be located in both local and remote memory storage devices.

In any case, it is understood that FIG. 1 is merely one configuration for a computing environment and computer system. Embodiments of the invention can apply to any comparable configuration, regardless of whether the computer system 110 is a complicated multi-user apparatus, a single-user workstation, or a network appliance that does not have non-volatile storage of its own.

The computer system 110 could include a number of operators and peripheral systems as shown, for example, by a mass storage interface 137 operably connected to a direct access storage device 138, and by a video interface 144 operably connected to a display 142. The display 142 may be any video output device for outputting viewable information. The computer system 110 could further include a number of storage media drives such as a CD-ROM drive 146 and a diskette drive 148 suitable to read out information permanently stored on non-writable storage media (e.g., read-only memory devices within a computer such as CD-ROM disks readable by CD-ROM drive 146) or alterable information stored on writable storage media (e.g., floppy disks readable by diskette drive 148). CD-ROM drive 146 and diskette drive 148 are illustrated as forming an integral part of computer system 110. It should, however, be appreciated, that either CD-ROM drive 146 or diskette drive 148, or both of them, may be provided as peripheral devices that are operably connected to the computer system 110.

Computer system 110 may further comprise any type of suitable input means (not shown) to give input to the computer system 100. For example, a keyboard, keypad, light pen, touch screen, button, mouse, track ball, or speech recognition unit could be used. Further, this input means and display 142 could be combined. For example, a display screen with an integrated touch screen, a display with an integrated keyboard or a speech recognition unit combined with a text speech converter could be used.

Computer system 110 is shown comprising at least one processor 112, which obtains instructions, or operation codes, (also known as opcodes), and data via a bus 114 from a main memory 116. The processor 112 could be any processor adapted to support the methods of the invention. In particular, the computer processor 112 is selected to support the features of the present invention. Illustratively, the processor is a PowerPC proessor available from International Business Machines Corporation of Armonk, N.Y.

Computer system 110 further comprises network interface 140 operably connected to data bus 114. Network interface 140 is suitable to establish a network connection between computer system 110 and another computer system via a communications network, preferably via the Internet.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in computing environment 100, for example, any storage capacity used as virtual memory or stored on a mass storage device (e.g., direct access storage device 138) or on another computer coupled to the computer system 110.

As shown, the main memory 116 includes an operating system 118. The operating system 118 may be any suitable operating system capable of supporting the functions of the present invention. An exemplary operating system, which may be used to advantage, is Linux. The main memory 116 may additionally include a database 120 for storing any type of information. The main memory 116 may further include any type of application programs 122 installed on the computer system 110. The application programs may comprise, for instance, office automation software comprising any tools for enabling a user to integrate traditional office activities, including processing text, generating presentations, sending and receiving messages and conferencing; games; Internet related applications, as well as more complex enterprise applications or one or more parts of such enterprise applications as used in, for example, the billing system of companies. The main memory 116 may also include a data structure 150 for storing data associated with one or more application programs.

The main memory 116 may also include a DBMS 170. The DBMS 170 may be adapted for managing a database documenting a business problem involving a plurality of interconnected entities, each entity having a one-to-many relationship and/or a many-to-many relationship with another entity. The DBMS 170 illustratively comprises a table creating unit 172 for creating a table for each entity of the plurality of entities; a determining unit 174 for determining, for each entity of the plurality of entities, whether the entity has a many-to-many relationship with another entity; and a generating unit 176 for creating a bridging table for each entity of the plurality of entities having a many-to-many relationship with another entity, the bridging table for describing the many-to-many relationship with the other entity; and a joining table for describing the interconnections between the plurality of entities using the created tables and the bridging table. The DBMS 170 further illustratively comprises a retrieving unit 178 for retrieving data from the created tables using the joining table.

FIG. 2 shows a computing environment 200 comprising the computer system 110 of FIG. 1 and a further illustrative computer system 210, both of which are connected to a communications network 160. According to FIG. 2, the network interface 140 of computer system 110 of FIG. 1 and the network interface 240 of computer system 210 are suitable to establish a network connection between computer system 110 and computer system 210 via communications network 160, preferably via the Internet.

For the purpose of simplicity, the features of computer system 110, which have been described above with respect to FIG. 1, have been omitted in FIG. 2. It should, however, be appreciated that embodiments of the invention can apply to any comparable configuration of computer system 110, regardless of whether the computer system 110 is a complicated multi-user apparatus, a single-user workstation, or a network appliance that does not have non-volatile storage of its own. Furthermore, only one further computer system 210 has been illustrated in FIG. 2. However, it should be clear that more than one computer system may be connected to the communications network 160.

Computer system 210 preferably comprises a processor 212 operably connected to the network interface 240 and a main memory 216 via data bus 214. The network interface 240 is suitable to establish the communication with computer system 110 via communications network 160.

The main memory 216 is any memory sufficiently large to hold the necessary programs and data structures. Main memory 216 could be one or a combination of memory devices, including Random Access Memory, nonvolatile or backup memory, (e.g., programmable or Flash memories, read-only memories, etc.). In addition, memory 216 may be considered to include memory physically located elsewhere in computing environment 200, for example, any storage capacity used as virtual memory or stored on a mass storage device (not shown) or on another computer coupled to the computer system 210.

As shown, the main memory 216 preferably includes any type of application programs 222 installed on the computer system 210. The application programs may comprise, for instance, office automation software comprising any tools for enabling a user to integrate traditional office activities, including processing text, generating presentations, sending and receiving messages and conferencing; games; Internet related applications, as well as more complex enterprise applications or one or more parts of such enterprise applications as used in, for example, the billing system of companies. The main memory 216 may include a database 220 for storing any type of information. The main memory 216 may additionally include a data structure 250 for storing data associated with one or more application programs.

Figure 3:
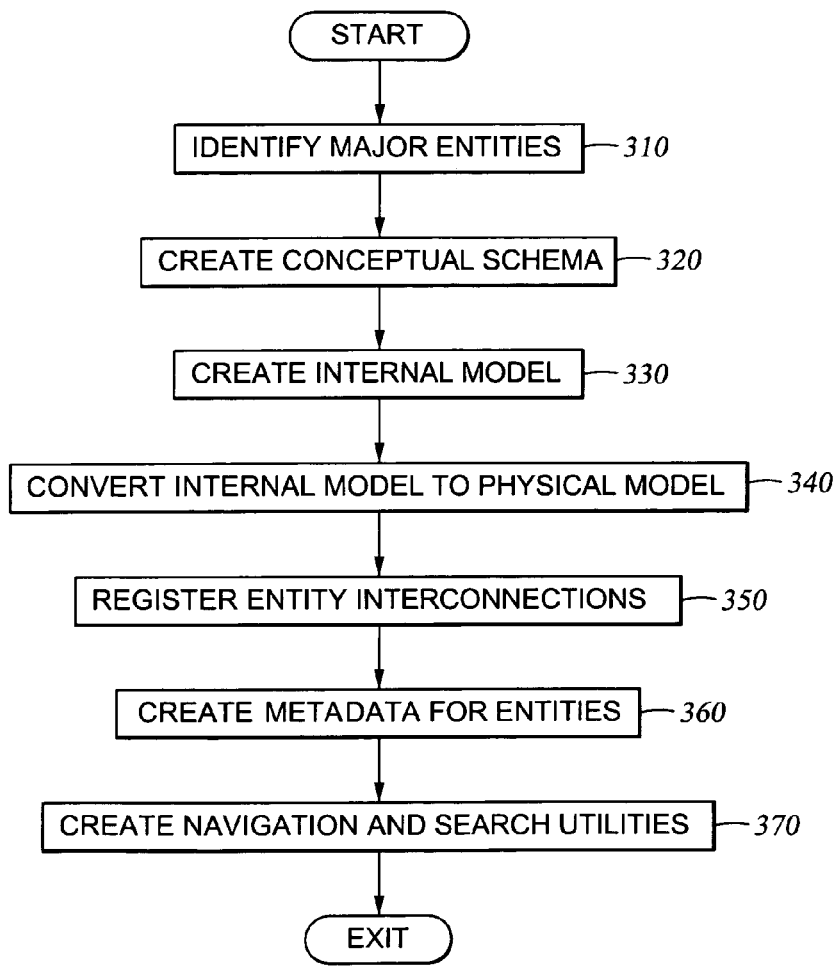
FIG. 3 is a flow chart illustrating a method for providing a database for documenting a business problem.

FIG. 3 illustrates a method of creating a database for documenting a business problem involving a plurality of interconnected entities (e.g., entities 1910, 1920, 1930, 1940 and 1950 of FIG. 19) according to one embodiment. Documenting the business problem comprises documenting the entities, interconnections between entities and data flow between entities.

In the underlying business problem, for instance, the university problem, each entity of the plurality of interconnected entities has at least one of a one-to-many relationship (e.g., the relationship between rooms and classes according to table 2202 of FIG. 22) and a many-to-many relationship with another entity and at least one of the entities (e.g., entity 1930 of FIG. 19) has a many-to-many relationship (e.g., the relationship between students and classes according to table 2004 of FIG. 20) with another entity (e.g., entity 1940 of FIG. 19).

In step 310, the major entities (e.g., entities 1910, 1920, 1930, 1940 and 1950 of FIG. 19) defining the business problem are identified. In step 320, a conceptual schema is created to represent how the different identified entities relate among each other. Thus, the conceptual schema represents an entity relationship diagram. In step 330, an internal model is created from the conceptual schema. The internal model identifies entities having many-to-many relationships, which must be adapted for use in a hierarchical database.

In step 340, the internal model is converted into a physical model adapted to requirements of an underlying database. In this step, each identified many-to-many relationship between a first and second interconnected entities is transformed into a one-to-many relationship between a corresponding first entity and a bridging table and a one-to-many relationship between the bridging table and a corresponding second entity. Furthermore, if, for example, the underlying database is Lotus Notes, forms and views may be created. Thus, data may be entered into the forms to populate corresponding tables to create the underlying data structure. Furthermore, the views may be used to display document summary type fields in rows and columns for a user to find particular interest document records and to navigate through the created database.

In step 350, interconnections between interconnected entities are registered using a joining table. The joining table may comprise paths between different entities identified in step 310, including paths between entities that are interconnected using a bridging table. Each entry in the joining table is derived from the internal model created in step 330. Each entry in the joining table defines how data associated with a specific entity may be retrieved departing from another entity.

Then, in step 360, meta-data is created for each entity, the meta-data defining types of data that may be extracted from a corresponding entity. Accordingly, data may be retrieved for displaying or outputting to a user. Generating the meta-data comprises generating tables documenting the entities, the interconnections between entities and/or the data flow between entities.

In step 370, retrieving components (e.g., retrieving unit 178 of FIG. 1) are created to retrieve data from the database. Retrieving components comprise navigation and search utilities to navigate and retrieve data. Creating retrieving components comprises generating, for example, graphical user interfaces that allow a user to see one or more related documents from one or more tables related to a view created in step 340. Thus, using a created retrieving component, a user may access data in a table associated with a specific view, which has been traversed using the joining list created in step 350.

In the following, the above-described method will be further illustrated by way of example with respect to FIGS. 4–11. Illustratively, FIGS. 4–11 show an implementation of the university problem described with respect to FIGS. 19–22 in Lotus Notes. However, it should be appreciated that the present invention is not limited to Lotus Notes, but that instead any hierarchical database, known or unknown, is contemplated.

In the university problem illustrated in FIG. 19, the entities professor 1910, course 1920, student 1930, class 1940 and room 1950 have been identified as major entities. It should be appreciated that more entities may be comprised within the university problem, however, for purposes of simplicity of the following explanation these entities have been omitted.

Figure 4:
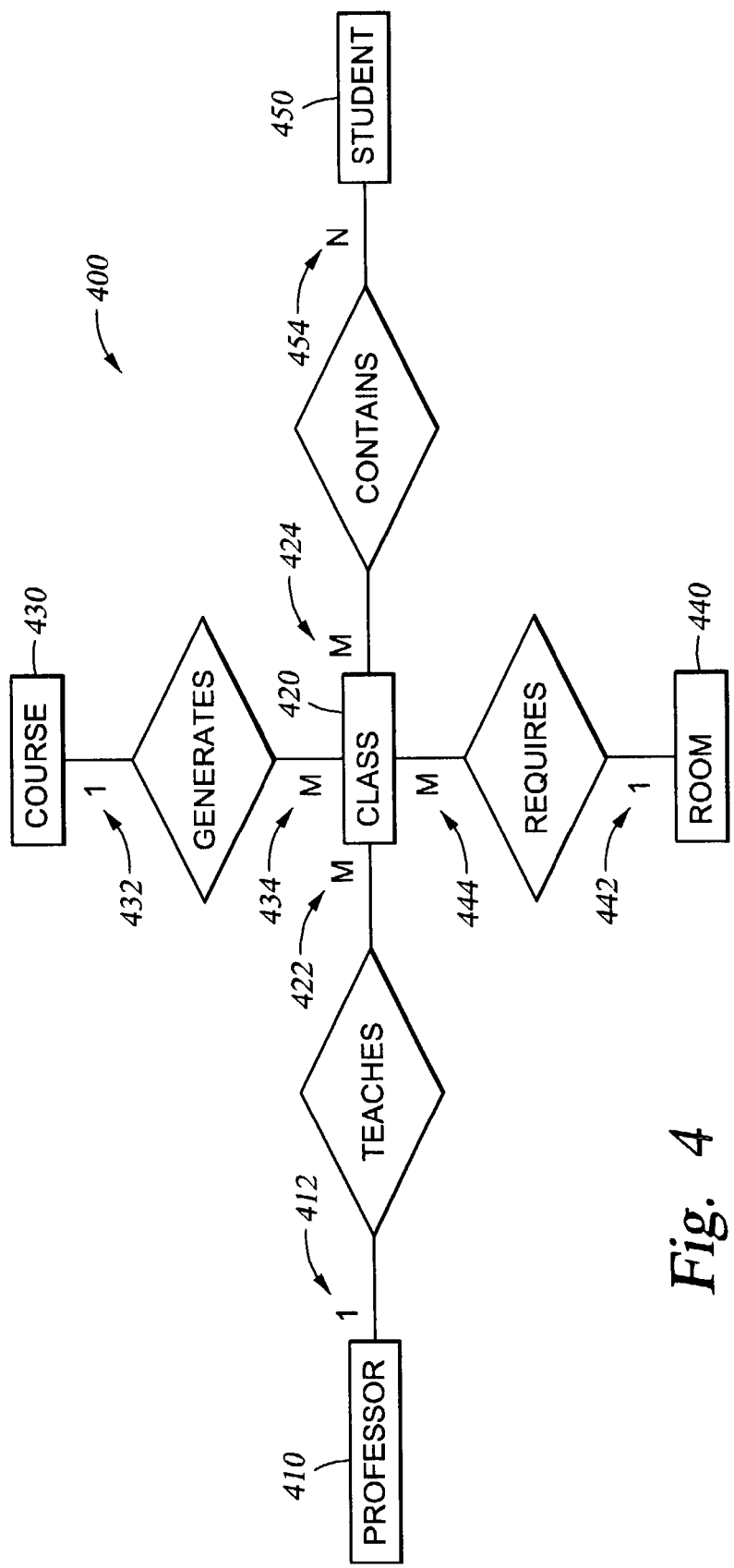
FIG. 4 is an illustration of an exemplary conceptual model.

Referring now to FIG. 4, a conceptual schema 400 is illustrated that defines how the identified major entities relate among each other. Accordingly, FIG. 4 comprises entities 410, 420, 430, 440 and 450 relating to the entities professor 1910, class 1940, course 1920, room 1950 and student 1930, respectively. As can be seen from FIG. 4, a one-to-many relationship exists between entities 410 and 420, designated by elements 412 "1" and 422 "M", illustrating that each professor ("1") teaches one or more ("M") classes. Furthermore, a one-to-many relationship exists between entities 430 and 420, designated by elements 432 "1" and 434 "M", illustrating that each course ("1") may generate one or more ("M") classes. Furthermore, a one-to-many relationship exists between entities 440 and 420, designated by elements 442 "1" and 444 "M", illustrating that each room ("1") may be used for teaching one or more ("M") classes.

Between entities 420 and 450, a many-to-many relationship has been identified, designated by elements 424 "M" and 454 "N", illustrating that each class may comprise one or more "N" students and that each student may attend one or more "M" classes.

Figure 5:
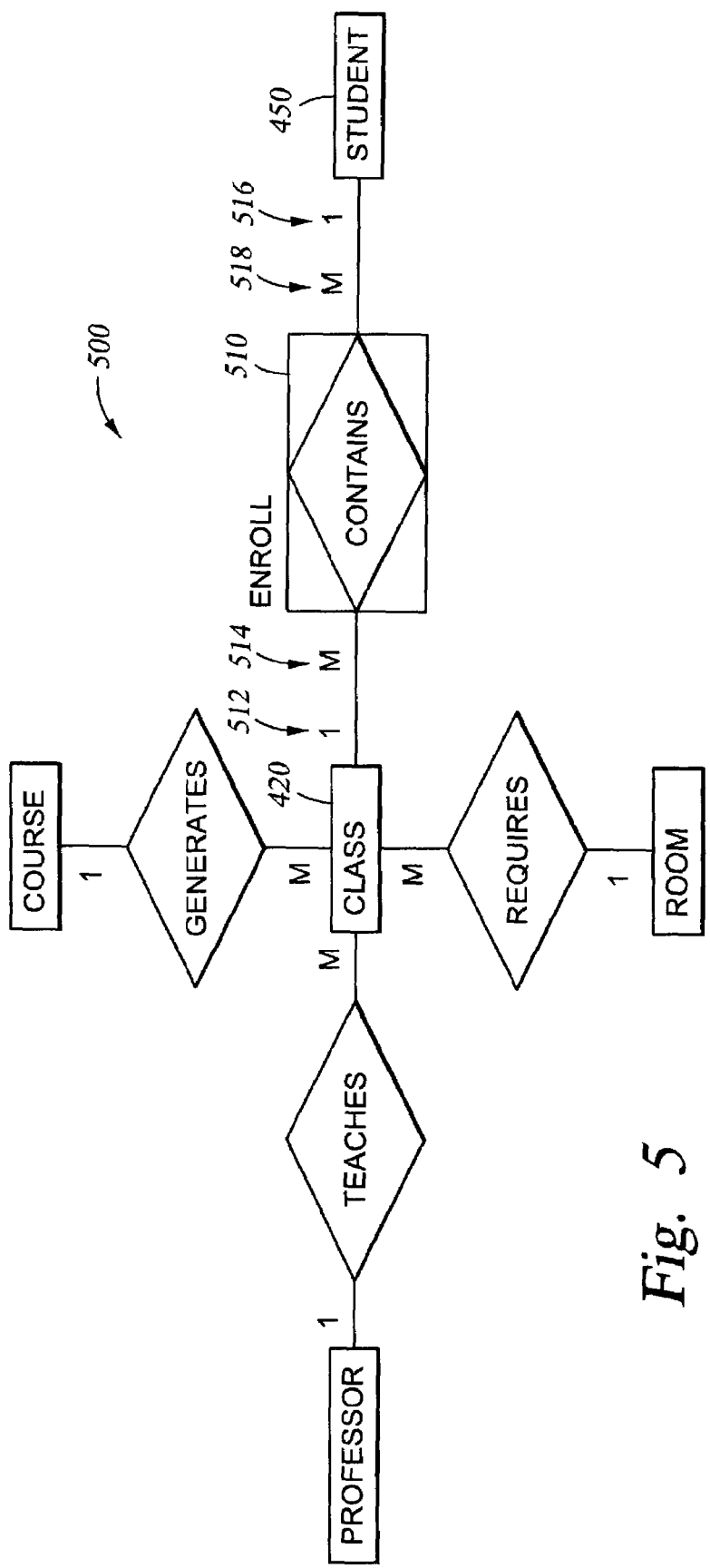
FIG. 5 is an illustration of an exemplary internal model.

FIG. 5 shows an internal model 500, which has been created from the conceptual model 400 of FIG. 4. Internal model 500 is suitable to adapt the many-to-many relationship between entity 420 relating to classes and entity 450 relating to students shown in FIG. 4 for use in a hierarchical database. Accordingly, the many-to-many relationship is transformed into two one-to-many relationships by creating a new entity 510 representing a bridging table labeled "ENROLL", such, that a one-to-many relationship is created between entities 420 and 510, as indicated by elements 512 "1" and 514 "M", and that furthermore a one-to-many relationship is created between entities 510 and 450, as indicated by elements 516 "1" and 518 "M".

Figures 6, 8:
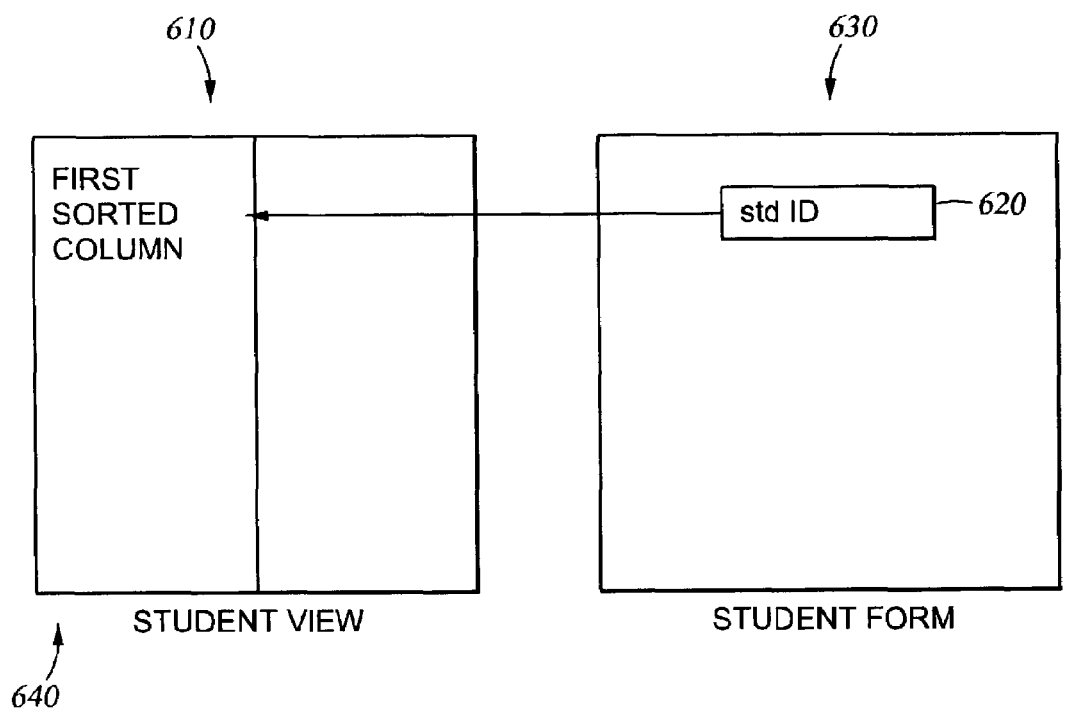
FIGS. 6–7 are illustrations of an exemplary physical model creation.
FIG. 8 is an illustration of an exemplary bridging structure.
Figure 7:
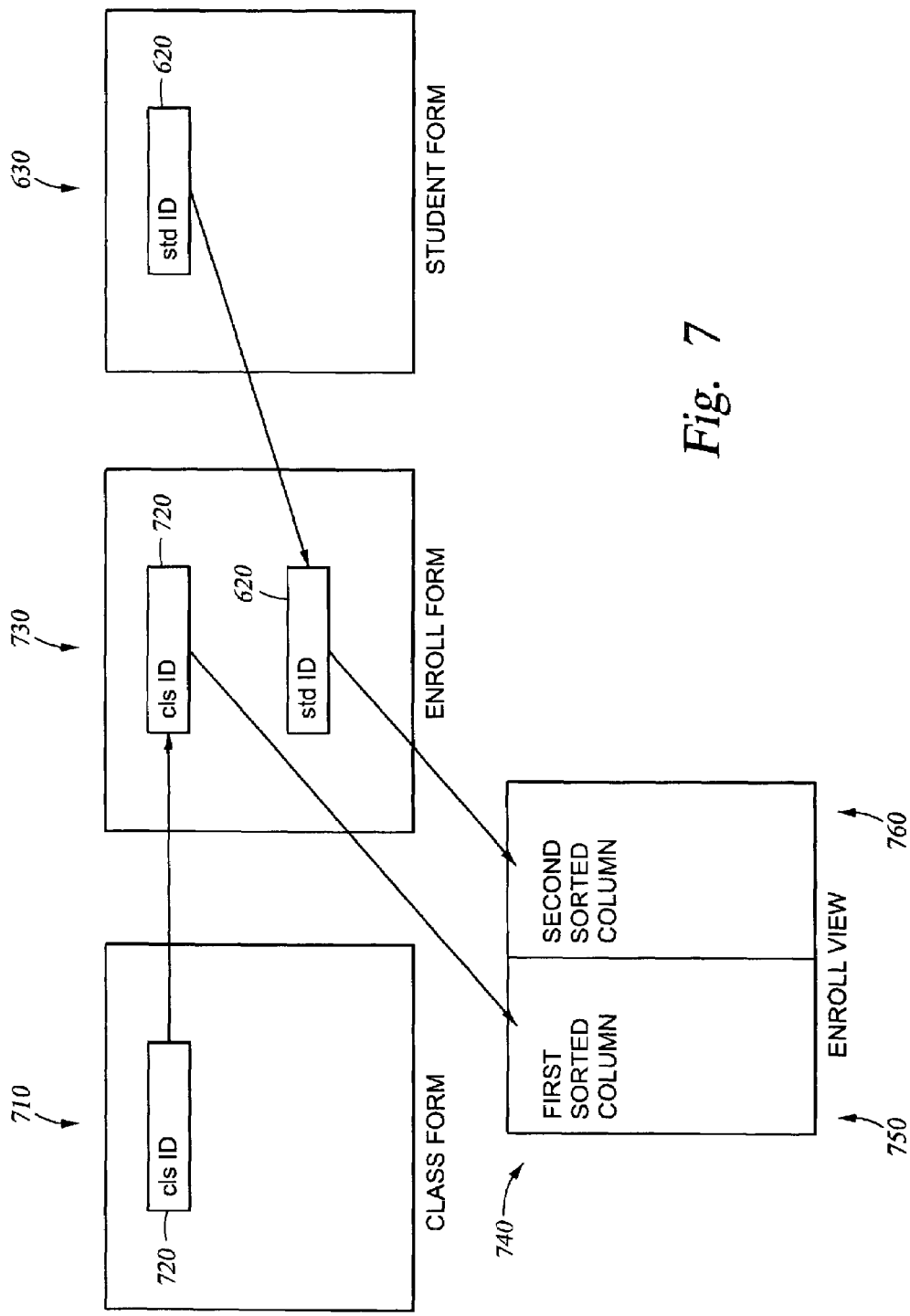

FIGS. 6–8 illustrate, how the internal model 500 of FIG. 5 is converted into a physical model suitable for use in Lotus Notes. In Lotus Notes, each entity (e.g., entities 410, 420, 430, 440 and 450 of FIG. 4 and 510 of FIG. 5) is represented as a view in the physical model. For instance, the student entity is represented as a STUDENT view 610. To link different views together to form the relationships represented in the internal model of FIG. 5, a primary key field is created in a corresponding form that the view will reference. For instance, a primary key field 620 is created in a STUDENT form 630 that the STUDENT view 610 will reference. Each view then filters the corresponding form and the primary key field becomes a column in the view. For example, for the STUDENT view 610, the primary key field "stdID" 620 is created in the STUDENT form 630. Then a column 640 is created in the STUDENT view 610 that references the "stdID" field 620.

Such primary keys are defined and forms and the referencing views are created for all connectivity of "1" in one-to-many relationships in the internal model. To handle the connectivity of "M" in many-to-many relationships in the internal model, a foreign key field is created in a bridging structure, as will be explained in the following.

FIG. 7 illustrates generation of an exemplary bridging structure comprising a form 730 labeled "ENROLL form" and a corresponding view 740 labeled "ENROLL view". The bridging structure is used to transform the many-to-many relationship between entities 420 and 450 of FIG. 4 into a one-to-many relationship between entity 420 and the bridging structure and a one-to-many relationship between the bridging structure and entity 450.

FIG. 7 comprises a CLASS form 710, STUDENT form 630 of FIG. 6, an ENROLL form 730 and ENROLL view 740. CLASS form 710 illustratively represents a form created for entity 420 of FIG. 4 and comprises a primary key field "clsID" 720 relating to column 2260 of table 2202 of FIG. 2. Form 630 has been described above with respect to FIG. 6. Using forms 630 and 710, the bridging structure is generated. Illustratively, the ENROLL form 730 has been generated comprising two foreign key fields "stdID" 620 and "clsID" 720 relating to the primary key fields 620 and 720 of tables 630 and 710, respectively. Then, the ENROLL view 740 is created comprising two columns 750 and 760, which reference the foreign key fields 720 and 620 of ENROLL form 730, respectively.

FIG. 8 illustrates an underlying bridging table 800 comprising the columns 750 and 760 of FIG. 7 relating to the identifiers of corresponding classes and students. With reference to table 2004 of FIG. 20, bridging table 800 has been populated illustratively using bridging form, i.e., ENROLL form 730 of FIG. 7, and data records 810, 820, 830, 840, 850, 860 and 870 have been created.

FIG. 9 illustrates creation of a joining structure 900 to register the interconnections between the entities identified in the university problem according to FIG. 4. The joining structure 900 allows related Lotus Notes views to be traversed to obtain, for example, documents from the different created tables. Each entry in the joining structure 900 is derived from the internal model of FIG. 5. Joining structure 900 comprises a plurality of entries, however, only two exemplary entries 910 and 920 will be explained in the following.

Entry 910 describes how related Lotus Notes view documents in the university problem should be traversed to retrieve desired information. According to entry 910, information related to a student from the student entity 450 of FIG. 4 is retrieved departing from a view created for the professor entity 410 of FIG. 4. Therefore, a PROFESSOR view, a CLASS view, an ENROLL view, and a STUDENT view are traversed.

Entry 910 indicates that first the PROFESSOR view corresponding to the professor entity is accessed. Then, primary key data from the PROFESSOR view document is analyzed to search the next view indicated in entry 910, which in this case is the CLASS view. Then, primary key data is taken from the CLASS view document to search the next view, which is in this case the ENROLL view of the bridging structure (e.g., ENROLL view 740 of FIG. 7). The results provided from the ENROLL view are the documents where the foreign key matches the primary key in the previous view. The last view to be used is the STUDENT view (e.g., STUDENT view 610 of FIG. 6), where the primary keys match the foreign keys in the previous ENROLL bridge view.

Entry 920 describes how related Lotus Notes views in the university problem should be traversed departing from a view created for the CLASS entity 420 of FIG. 5 in order to retrieve information related to a student from the student entity 450 of FIG. 5. An exemplary traversal of different associated views corresponding to entry 920 is shown in FIG. 10, illustrating how a document comprising a list of students may be determined for a given class document.

Assume that the names of students attending a specific class, e.g., class A of column 2270 of table 2202 of FIG. 22, should be determined. To this event, the joining structure 900 of FIG. 9 would be parsed and entry 920 would be determined, indicating how the CLASS, ENROLL and STUDENT views should be traversed to determine the desired list of students.

Figure 10:
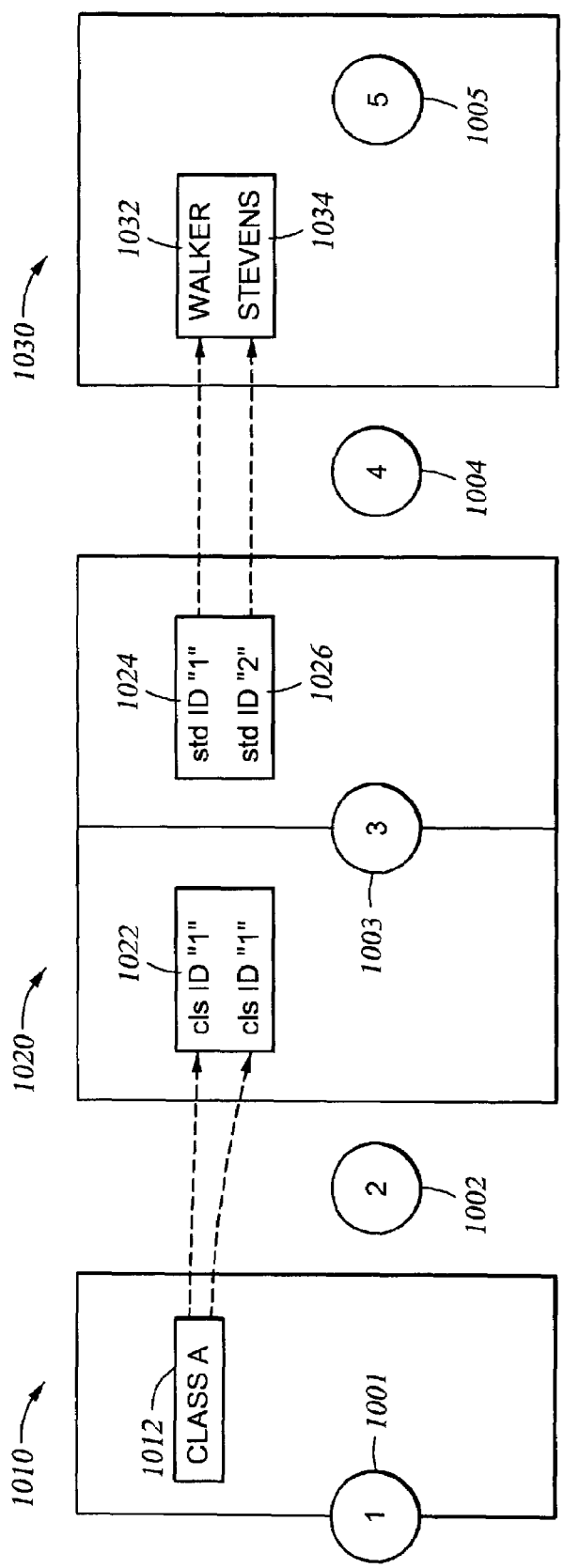
FIG. 10 is an illustration of an exemplary data retrieving process.

Referring now to FIG. 10, in a first step 1001, a CLASS view 1010 referencing, for example, CLASS form 720 of FIG. 7, is searched, which holds as result "class A" document 1012, representing a users current document. Furthermore, an internal identifier "clsID I" 1022 uniquely identifying "class A" in an underlying data table, e.g., table 2202 of FIG. 22, is determined. In step 1002, a bridging view 1020, for instance, ENROLL view 720 of FIG. 7, is searched for class identifier 1022 and, in the present example, two data records are determined, which are associated with the internal identifier of "class A" document. Two foreign keys "stdID 1" 1024 and "stdID 2" 1026 are pulled in the second column of bridging view 1020, which are associated with class identifier 1022. In step 1004, the pulled foreign keys 1024 and 1026 are used to search STUDENT view 1030 (e.g., STUDENT view 610 of FIG. 6) to determine documents relating to identified students "Walker" 1032 and "Stevens" 1034, which are uniquely identified by the identifiers 1024 and 1026. As a result, in step 1005, two documents are returned, the documents comprising information relating to the determined students.

Figure 11:
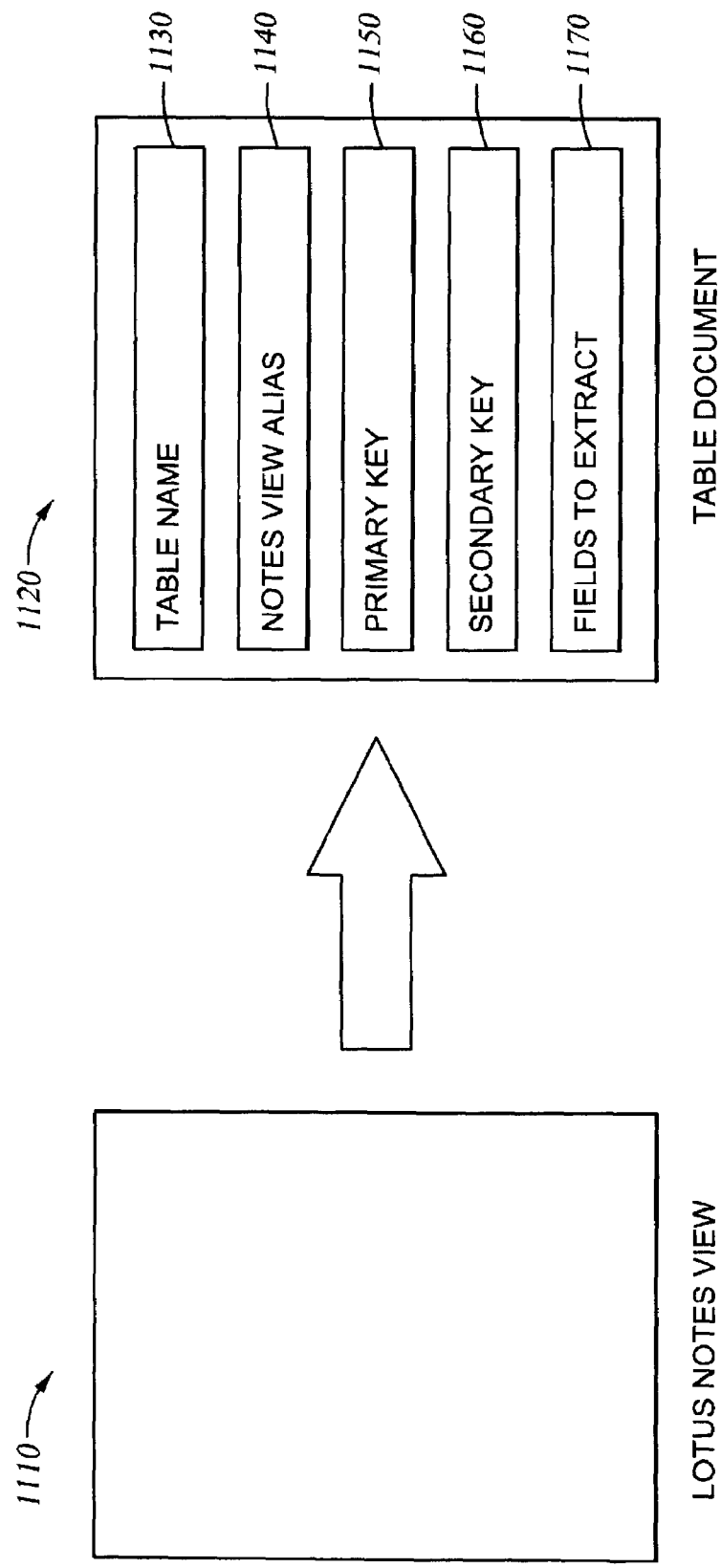
FIG. 11 is an illustration of an underlying data schema.

FIG. 11 comprises a Lotus Notes view 1110 and a table document 1120 and illustrates, how the underlying data documenting the entities, interconnections between entities and/or data flow between entities may be stored. Accordingly, a table document may be created for each Lotus Notes view (e.g., STUDENT view 610 of FIG. 6).

For Lotus Notes view 1110, table document 1120 is created comprising a plurality of fields, each field comprising information associated with the Lotus Notes view 1110. Illustratively, table 1120 includes a first field 1130 comprising a table name, a second field 1140 comprising a Lotus Notes view alias, a third field 1150 comprising a primary key, a fourth field 1160 comprising a secondary key and a fifth field 1170 comprising fields that may be extracted from the table document, i.e., from the underlying data. The data stored in table document 1120 represents meta-data comprising information related to Lotus Notes view 1110, which may alternatively be stored in a corresponding file in memory.

The table name according to field 1130 may be used for administrator identification purposes. The Lotus Notes view alias in field 1140 may be the internal name held within Lotus Notes that is used to access a specific view. The primary and secondary keys in fields 1150 and 1160, respectively, are the first and second columns within the Lotus Notes view, respectively. In field 1170, the fields that may be extracted are the fields to dynamically pull from the underlying data for this purpose.

Using a table document 1120 for each entity allows to keep the corresponding programming logic generic, so that each table document is more or less a parameter that is passed into the logic for processing while this type of information is not hard-coded within the programming logic itself. Furthermore, it adds great flexibility in adding tables and interconnections into the internal model.

Figure 17:
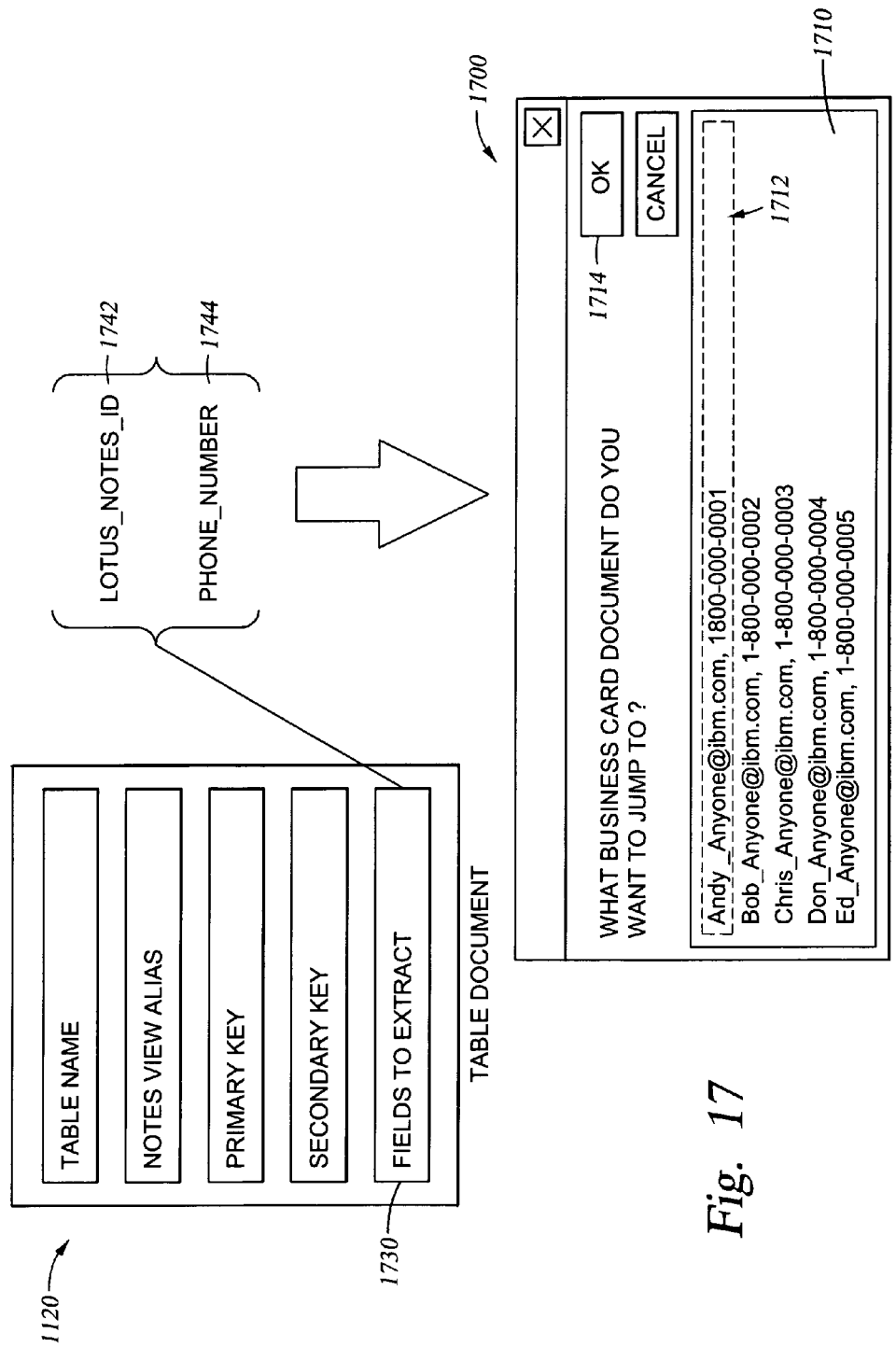

Finally, retrieving components are created. Such retrieving components allow the user to see one or more detail related documents from one or more related tables on a particular Lotus Notes document. The retrieving components comprise, for example, "navigation" and "go to connected" components. FIGS. 17–18, which will be described later, are exemplary screen shots of retrieving component graphical user interfaces illustrating such "navigation" and "go to connected" components.

One advantage of the present invention resides in reuse of a created underlying data structure according to the above method when creating another database for documenting a business problem involving a plurality of interconnected entities (e.g., entities 1910, 1920, 1930, 1940 and 1950 of FIG. 19). One embodiment for realizing this advantage will be explained in the following with respect to FIGS. 12–18.

Assume a complex business problem relating to enterprise resource planning (ERP), in the following referred to as the ERP problem, within a large company where many applications across multiple geographically distributed computers anywhere in the world are linked together to provide a seamless whole to a customer allowing to automatically follow and manage an individual order from inception to closure. This may include pricing (dependencies on local currencies, local tax rate, local discount agreements), manufacturing, delivery and invoicing. The deployment of ERP is performed and separated into a plurality of steps, wherein in each step a part of the ERP is deployed. For each part of the ERP which is deployed, separate tests are run across the world to ensure that each deployment meets specific design requirements. These tests may involve many existing legacy applications on many different environments like MVS, AIX, AS/400, Lotus Notes, Windows NT, etc. The legacy applications will in many cases be used in multiple tests across multiple geographically distributed computers, and also run concurrently with each other. Furthermore, different testing cycles may also run concurrently with each other.

Figure 12:
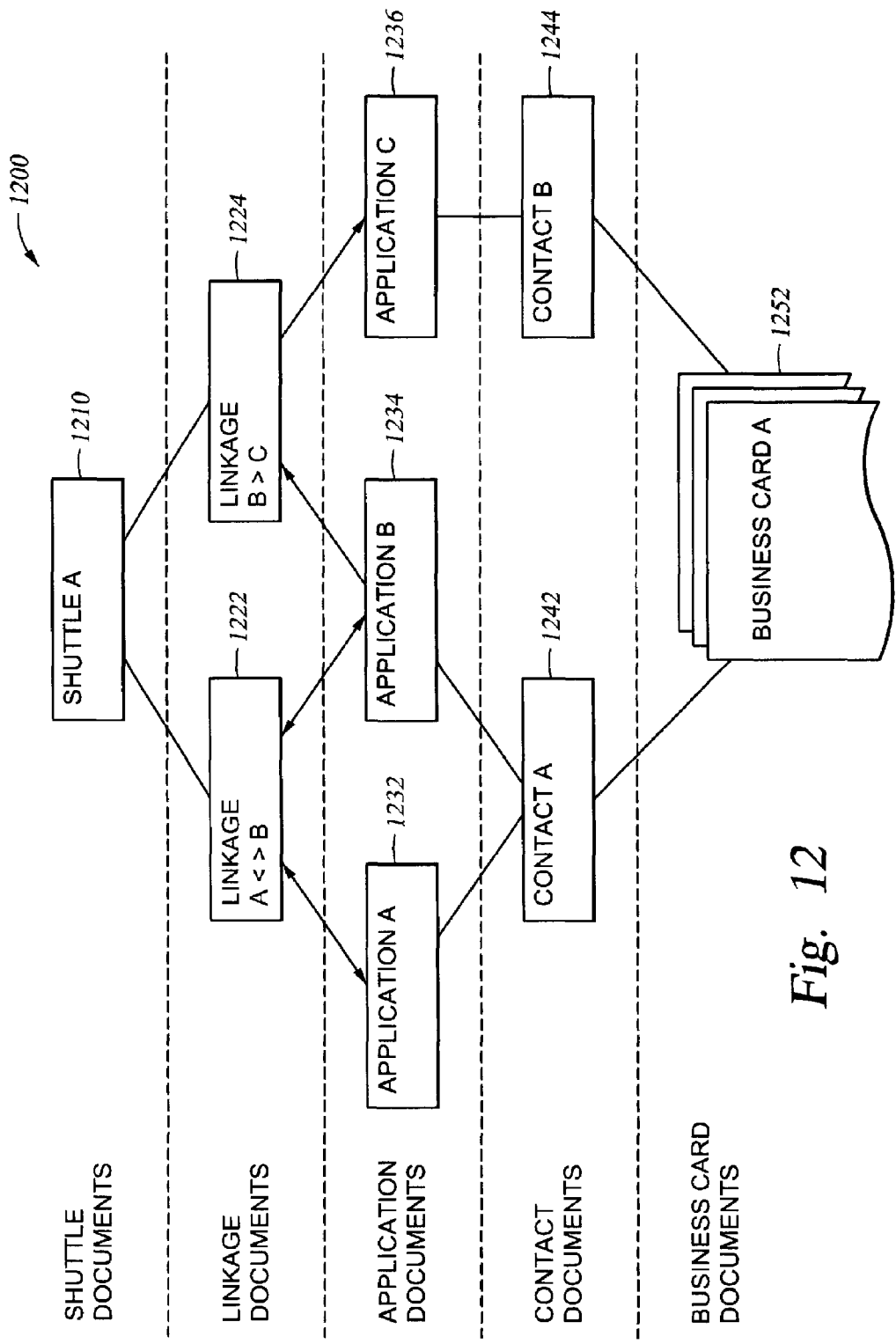
FIG. 12 is an illustration of an exemplary business problem.

Referring now to FIG. 12, a plurality of interconnected entities 1210, 1222, 1224, 1232, 1234, 1236, 1242, 1244 and 1252 is shown, which have been identified as major entities in the underlying ERP problem. The ERP problem may involve a plurality of different systems referred to as shuttles, each shuttle associated with information on an entire test for an individual test program. A shuttle may comprise information related to test dates, presentations, etc.

Each shuttle represents a grouping of components that can be linked together to form a larger whole. Illustratively, a shuttle is a grouping of individual computer applications that are linked together to form a complete application system that is to be tested.

FIG. 12 shows an exemplary test environment including a single shuttle "shuttle A" 1210. The shuttle 1210 is made up of two linkages 1222 and 1224. Each linkage describes how different applications are linked together so that information can pass between these applications, the communication methods used between applications and how the corresponding linkage is created.

Accordingly, linkage 1222 links two applications A and B together. The data flow between applications A and B is bi-directional. Linkage 1224 links two applications B and C together. The data flow between applications B and C is unidirectional, i.e., a one-way flow from application B to application C.

Environment 1200 comprises accordingly three applications, a first application "application A" 1232, a second application "application B" 1234 and a third application "application C" 1236. Each application consists of application details, information where the application is located, the type of hardware it runs on and information on what it is designed to do.

Each application is linked with contact information indicating who are the contacts that need to be contacted, for example, to fix problems discovered with a specific application. Accordingly, applications 1232 and 1234 are linked with contacts "contact A" 1242 and application 1236 is linked with contacts "contact B" 1234.

Each one of contacts 1242 and 1244 may comprise a list of persons grouped together as contacts for a corresponding application. Each one of the persons listed in one of contact documents 1242 and 1244 is related with a specific business card 1252 comprising and centralizing personal contact information.

As can be seen from FIG. 12, environment 1200 represents a relational schema comprising one-to-many relationships, for example, between shuttle 1210 and linkages 1222 and 1224, and further comprises many-to-many relationships, for example, between linkages 1222 and 1224 and applications 1232, 1234 and 1236. In the following, with respect to FIGS. 13–18, it will be explained how this relational schema describing the ERP problem may be implemented in a hierarchical database, for instance, Lotus Notes from IBM, by re-using elements which have been previously created for another business problem, e.g., for the university problem described with respect to FIGS. 4–11.

Figure 13:
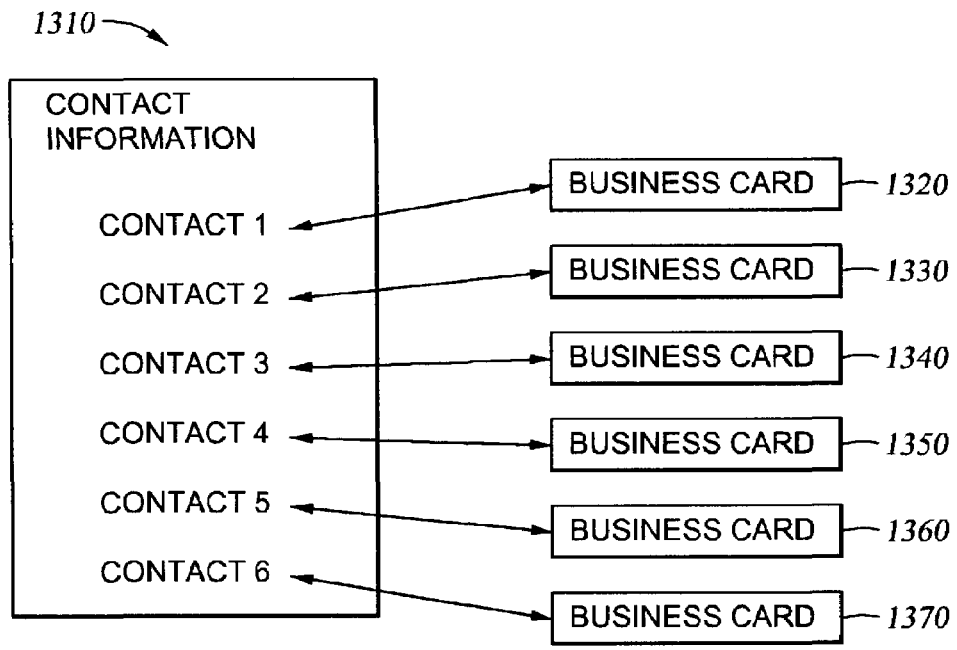
FIGS. 13–16 are illustrations of an implementation of the exemplary business problem of FIG. 12.

Referring now to FIG. 13, indications of a plurality of business cards 1320, 1330, 1340, 1350, 1360 and 1370, each of which comprises personal contact information of a specific contact person, are combined together in a contact information table 1310. Contact information table 1310 defines a contact document that provides a place to link a set of business cards together so that from one contact document links to different types of contacts may be created, e.g., business as usual contacts, hardware support contacts or application development contacts.

Each of the persons associated with one of the business cards 1320, 1330, 1340, 1350, 1360 and 1370 has been identified as playing a roll in a test cycle within the ERP problem. If a contact changes during the test cycle, the business card 1320, 1330, 1340, 1350, 1360 or 1370 of the previous contact may be updated to comprise the personal contact information of the new contact person and all other related documents will automatically reflect the updates of the corresponding business card, as all these documents will pick-up the updates made to the corresponding business cards via the contact document 1310.

Figure 14:
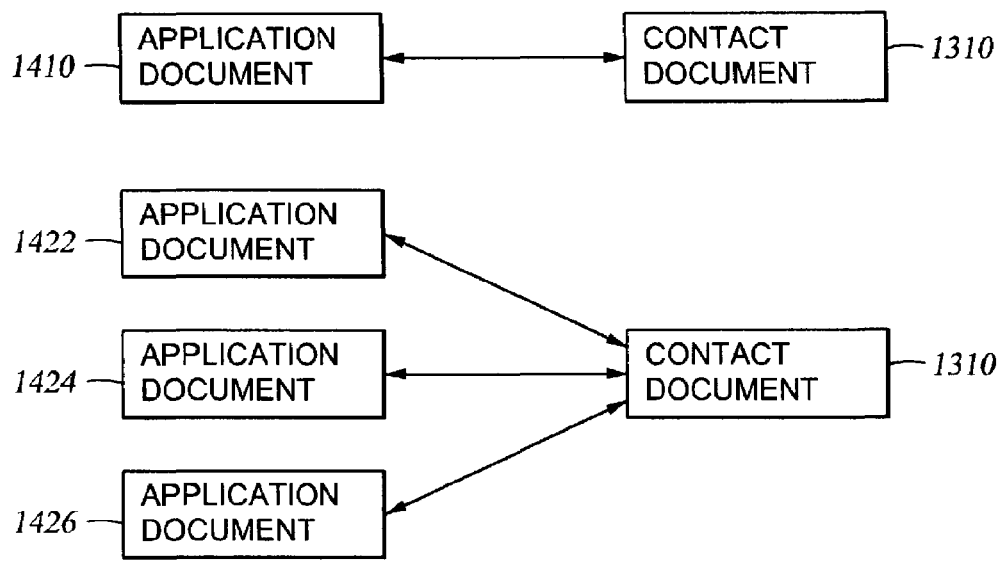

FIG. 14 shows how the contact information comprised in contact document 1310 is linked with one or more particular relevant applications. One or more particular application documents represent information relating to a specific application and may comprise the application itself. Accordingly, contact document 1310 may be linked to one application document 1410 or, if required, to a plurality of application documents 1422, 1424 and 1426. Thus, the process for data entry may be accelerated and the information needed to be hard-coded in the database may be minimized while allowing ease of maintenance.

Figure 15:
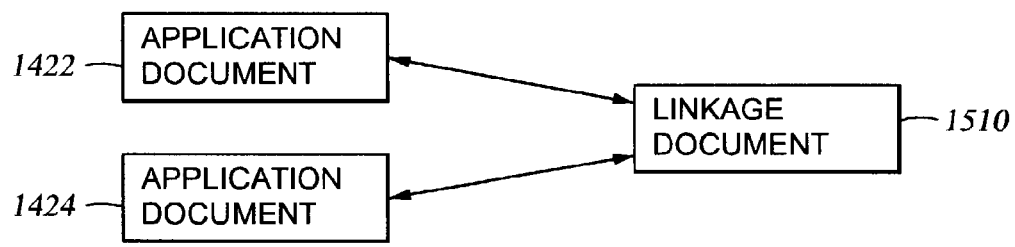

FIG. 15 shows how a linkage document 1510 is created. Illustratively, two application documents 1422 and 1424 have been selected and linked to each other by linkage document 1510. This linkage document is used to link the applications together and to provide details on how data is passed between them, i.e., to describe a corresponding data flow, which may be unidirectional or bi-directional. Accordingly, linkage documents allow to move between applications in an underlying business problem and to follow the flow of data between the various applications and systems included in a shuttle.

Figure 16:
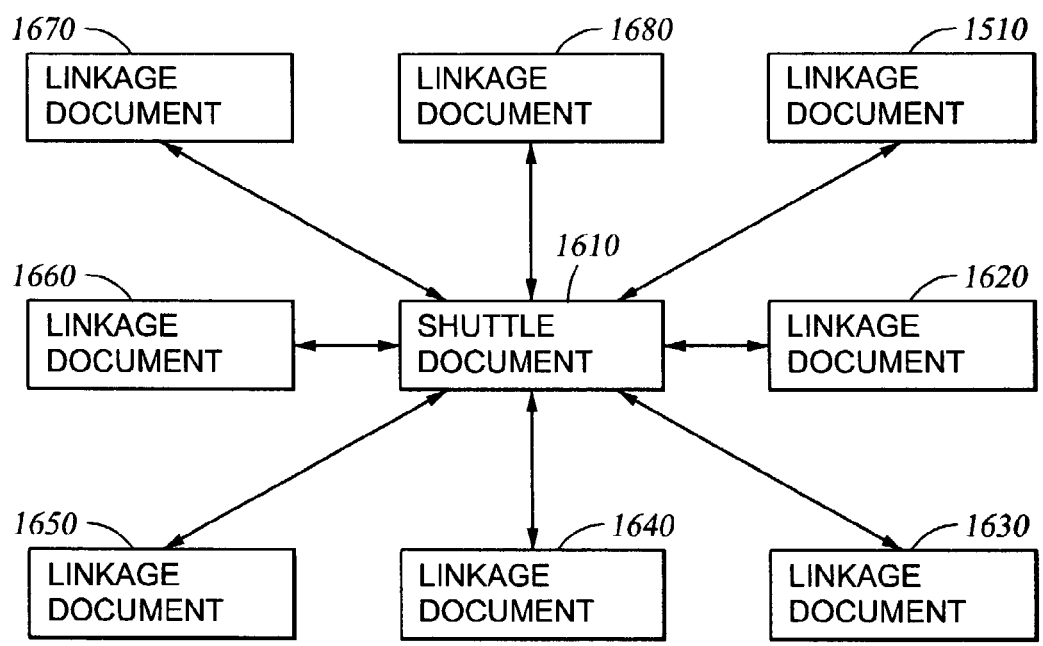

FIG. 16 shows how a shuttle or shuttle document 1610 may be created by linking a plurality of linkage documents together. Illustratively, linkage document 1510 of FIG. 15 and other linkage documents 1620, 1630, 1640, 1650, 1660, 1670 and 1680 have been linked together within shuttle document 1610.

Accordingly, within one shuttle document plural applications are linked together via linkages and a plurality of contact persons having business cards is grouped in contact documents associated with the applications, the shuttle document representing a desired test environment in a business problem. Furthermore, a plurality of shuttles may be created representing different test environments within the business problem.

As can be seen from the preceding description, as much data as possible is reused. In more detail, when a new shuttle is created, it is sufficient to build new links or linkages required for that shuttle by adding any new applications that come into scope within linkages. Then a new shuttle document is created and all the linkages are associated to that shuttle. This shuttle creation brings in details for all the applications and contact information. In addition, the linkages and applications are updated to show that they are part of multiple shuttles. By associating the linkages to the shuttle rather than the applications many problems may be avoided that appear using traditional methods, i.e., if the applications were associated directly to the shuttle, it would be difficult to identify which links were relevant and furthermore, it would be difficult to determine if multiple links exist between two applications.

Accordingly, a new shuttle is created by identifying which links are required for the shuttle; identifying which of the identified links are already documented; adding new links, applications etc. as required to the database and joining all existing and newly created required links to the shuttle document. This brings in all applications, contacts etc. Thus, depending on the information created and stored, it is possible to document interconnections between entities as well as documenting the entities themselves or data flows or processes in business problems.

FIGS. 17 and 18 illustrate different retrieving components. FIG. 17 shows a screen shot 1700 of a retrieving component comprising a field 1710 with a plurality of data records. FIG. 17 further illustrates the relation between a table document 1720, e.g., table document 1120 of FIG. 11, and the retrieving component. Table document 1720 comprises a portion 1730 comprising fields that may be extracted from an underlying data table. These fields illustratively comprise a Lotus Notes identifier "Lotus_Notes_ID" 1742 and a phone number "Phone_Number" 1744.

The screen shot 1700 of the retrieving component comprises a list derived from portion 1730 of table document 1720 relating to data describing a corresponding entity. For example, if a user wants to connect to a specific business card, the parent table document would be a table document relating to a plurality of business cards. If the fields, which may be extracted of portion 1730, comprise, for example, Lotus Notes identifier 1742 and phone number 1744, screen shot 1700 would comprise a list box 1710 with a plurality of personal contact indications, each personal contact indication comprising a corresponding Lotus Notes identifier and a phone number. If a user wants to select one of the underlying business cards documents from the list box, he would, for example, select a data record, for example data record 1712, and push a "OK" button 1714. Thus, the business card document associated with data record 1712 may be opened.

FIG. 18 shows a screen shot 1800 of a navigation form representing an alternative retrieving component. Screen shot 1800 represents a graphical user interface allowing a user to see one or more related documents from one or more related tables and a specific Lotus Notes document.

Assume that a user using a specific application requests for an indication of all business cards of contact persons associated with the corresponding application. According to an entry 1810 in a corresponding joining structure, related views concerning applications, contacts and business cards are traversed beginning in a corresponding application document to determine a related business card. For example, if the user wants to see all business cards for a particular application or a set of applications, he would select both applications in a corresponding Lotus Notes view and then go up to a corresponding menu function and select a "business cards" menu option. This action will create a single document underlying the screen shot 1800 and showing the related business cards that are associated with the selected applications. The single document is displayed in form of a list 1820 and comprises a plurality of Lotus Notes doc-links provided for the user so that he can access a corresponding business card document with a single click of a computer mouse.

It should be appreciated, that the above example of the ERP business problem has only be described for purposes of illustration, but is not intended to limit the use of the described techniques thereto. For example, the inventive method, apparatus and article of manufacture may not only be used in a Testing environment as described above, but also, e.g., in a Production environment.

While the foregoing is directed to embodiments of the present invention, other and further embodiments of the invention may be devised without departing from the basic scope thereof, and the scope thereof is determined by the claims that follow.

What is claimed is:

1. A computer-implemented method of implementing a relational schema comprising at least one many-to-many relationship in a hierarchical database supporting one-to-many relationships, the relational schema being defined by a plurality of entities including at least one first entity having N components and at least one second entity having M components, the first and the second entity having a many-to-many relationship, the method comprising:
creating a bridging table to transform the many-to-many relationship between the first and the second entities into a one-to-many relationship between the first entity and the bridging table and a one-to-many relationship between the bridging table and the second entity;
for each mapping between one of the N components and one of the M components:
creating an entry in the bridging table, the entry comprising a mapping between the one of the N components and the one of the M components; and creating, using the bridging table, a joining table describing interconnections between the plurality of entities, the joining table having a plurality of entries, each defining a path between different entities of the plurality of entities.

2. A computer-implemented method of describing interconnections between a plurality of entities comprising at least one first entity having N components and at least one second entity having M components, each one of the N components being related to at least one of the M components, the method comprising:
creating a bridging structure for mapping the N components of the at least one first entity to the M components of the at least one second entity; and
creating, using the bridging structure, a joining structure describing the interconnections between the plurality of entities, the joining structure defining paths between different entities of the plurality of entities.

3. A computer-implemented method of creating a database for documenting interconnections between a plurality of entities, each entity having at least one of a one-to-many relationship and a many-to-many relationship with another entity, the method comprising:
for each entity of the plurality of entities:
determining data describing the entity;
creating a table using the determined data; and
determining, whether the entity has a many-to-many relationship with another entity;
for each entity of the plurality of entities having a many-to-many relationship with another entity:
creating a bridging table describing the many-to-many relationship with the other entity, the bridging table having an entry for each mapping between a component of the entity and a related component of the other entity; and
creating, using the created tables and the bridging table, a joining table describing the interconnections between the plurality of entities, the joining table having a plurality of entries, each defining a path between different entities of the plurality of entities; and
creating, using the joining table, a plurality of retrieving components for retrieving data from the created tables.

4. A computer-readable storage medium containing a program which, when executed, performs an operation of implementing a relational schema comprising at least one many-to-many relationship in a hierarchical database supporting one-to-many relationships, the relational schema being defined by a plurality of entities including at least one first entity having N components and at least one second entity having M components, the first and the second entity having a many-to-many relationship, the operation comprising:
generating a bridging table to transform the many-to-many relationship between the first and the second entities into a one-to-many relationship between the first entity and the bridging table and a one-to-many relationship between the bridging table and the second entity;
for each mapping between one of the N components and one of the M components:
creating an entry in the bridging table, the entry comprising a mapping between the one of the N components and the one of the M components; and
creating, using the bridging table, a joining table describing interconnections between the plurality of entities, the joining table having a plurality of entries, each defining a path between different entities of the plurality of entities.

5. The computer-readable storage medium of claim 4, wherein the operation further comprises:
for each entity of the plurality of entities:
receiving data describing the entity; and
creating a table using the received data.

6. The computer-readable storage medium of claim 5, wherein the operation further comprises:
generating at least one retrieving component for retrieving data from the created tables describing the entities.

7. The computer-readable storage medium of claim 6, wherein the operation further comprises:
retrieving data from the created tables describing the entities using the at least one retrieving component.

8. A computer-readable storage medium containing a program which, when executed, performs an operation of describing interconnections between a plurality of entities comprising at least one first entity having N components and at least one second entity having M components, each one of the N components being related to at least one of the M components, the operation comprising:
generating a bridging structure for mapping the N components of the at least one first entity to the M components of the at least one second entity; and
generating, using the bridging structure, a joining structure describing the interconnections between the plurality of entities, the joining structure defining paths between different entities of the plurality of entities.

9. The computer-readable storage medium of claim 8, wherein the operation further comprises:
for each entity of the plurality of entities:
receiving data documenting at least one of the entity, an interconnection to another entity and a data flow to and from another entity;
creating, using the received data, at least one of an entity description documenting the entity, an interconnection description documenting the interconnection to another entity and a data flow description documenting the data flow to and from another entity; and
storing the at least one created description in a storage of the computer system.

10. The computer-readable storage medium of claim 9, wherein the operation further comprises:
generating, using the joining structure, at least one retrieving component for retrieving data from the created descriptions.

11. The computer-readable storage medium of claim 10, wherein the operation further comprises:
retrieving data from the created descriptions using the at least one retrieving component.

12. The computer-readable medium of claim 11, wherein retrieving data from the created descriptions comprises:
receiving, from a current entity, a request to retrieve data associated with a specific entity;
retrieving, from the joining structure, path describing the interconnection between the specific entity and the current entity;
retrieving, using the path, the requested data; and
displaying the retrieved data.

13. The computer-readable medium of claim 12, wherein the indication comprises a path between the two interconnected entities.

14. A computer-readable storage medium containing a program which, when executed, performs an operation of providing a database for documenting a business problem involving a plurality of interconnected entities, each entity having at least one of a one-to-many relationship and a many-to-many relationship with another entity and at least one entity having a many-to-many relationship with another entity, the operation comprising:

for each entity of the plurality of entities:
receiving data describing the entity;
generating a table using the received data; and
determining, whether the entity has a many-to-many relationship with another entity;

for each entity of the plurality of entities having a many-to-many relationship with another entity:
generating a bridging table describing the many-to-many relationship with the other entity, the bridging table having an entry for each mapping between a component of the entity and a related component of the other entity;

generating, using the generated tables and the bridging table, a joining table describing the interconnections between the plurality of entities, the joining table having a plurality of entries, each defining a path between different entities of the plurality of entities; and generating, using the joining table, a plurality of retrieving components for retrieving data from the generated tables.

15. The computer-readable storage medium of claim 14, wherein the plurality of interconnected entities comprises at least one first entity having N components and at least one second entity having M components, the first and the second entity having a many-to-many relationship, and wherein generating a bridging table comprises:

generating the bridging table to transform the many-to-many relationship between the first and the second entities into a one-to-many relationship between the first entity and the bridging table and a one-to-many relationship between the bridging table and the second entity; and for each mapping between one of the N components and one of the M components:
creating an entry in the bridging table, the entry comprising a mapping between the one of the N components and the one of the M components.

16. The computer-readable storage medium of claim 14, wherein the database comprises at least one of a hierarchical and a relational database.

17. The computer-readable storage medium of claim 14, wherein the plurality of entities defines a relational schema.

18. The computer-readable storage medium of claim 14, wherein the operation further comprises:
receiving data documenting at least one of a specific entity, an interconnection between the specific entity and another entity and a data flow from the specific entity to and from another entity;
associating the received data with the specific entity; and
storing the received data in the storage medium of the computer system.

19. The computer-readable storage medium of claim 14, wherein, for each entity of the plurality of entities:
receiving data describing the entity comprises receiving data documenting at least one of the entity, an interconnection to another entity and a data flow to and from another entity; and
generating a table using the received data comprises generating at least one of an entity description table documenting the entity, an interconnection description table documenting the interconnection to another entity and a data flow description table documenting the data flow to and from another entity.

20. The computer-readable storage medium of claim 19, wherein the operation further comprises:
retrieving data from the generated description tables using at least one of the plurality of retrieving components.

21. The computer-readable storage medium of claim 20, wherein retrieving data from the generated description tables comprises:
receiving, from a current entity, a request to retrieve data associated with a specific entity;
retrieving, from the joining structure, a path describing the interconnection between the specific entity and the current entity;
retrieving, using the path, the requested data; and
displaying the retrieved data.

22. The computer-readable storage medium of claim 14, wherein the plurality of interconnected entities comprises a plurality of applications, contacts and linkages and at least one shuttle, wherein:
the applications are linked to contacts;
the linkages define links between applications; and
the at least one shuttle defines an architecture comprising at least one linkage.

23. The computer-readable storage medium of claim 14, wherein the plurality of retrieving components comprises at least one navigation component for navigating between different entities.

24. The computer-readable storage medium of claim 14, wherein the operation further comprises:
receiving data describing at least one new entity to the plurality of entities;
generating at least one table using the received data;
determining, whether the at least one new entity has a many-to-many relationship with another entity;
if the at least one new entity has a many-to-many relationship with another entity:
generating a bridging table describing the many-to-many relationship with the other entity;
determining the interconnections between the at least one new entity and each entity of the plurality of entities;
updating the joining table using the bridging table and the determined interconnections; and
updating the plurality of retrieving components.

25. A computer readable program product in a storage medium, the computer program product defining a documentation manager for managing a database documenting a business problem involving a plurality of interconnected entities, each entity having at least one of a one-to-many relationship and a many-to-many relationship with another entity, the documentation manager comprising:

a table creating unit for creating a table for each entity of the plurality of entities;
a determining unit for determining, for each entity of the plurality of entities, whether the entity has a many-to-many relationship with another entity; and
a generating unit for creating:
a bridging table for each entity of the plurality of entities having a many-to-many relationship with another entity, the bridging table for describing the many-to-many relationship of the entity with the other entity and having an entry for each mapping between a component of the entity and a related component of the other entity; and a joining table for describing the interconnections between the plurality of entities using the created tables and the bridging table, the joining table having a plurality of entries, each defining a path between different entities of the plurality of entities; and at least one retrieving component for retrieving data from the created tables using the joining table.

26. The computer readable program product of claim 25, wherein each entity of the plurality of entities is associated with data documenting at least one of the entity, an interconnection to another entity and a data flow to and from another entity; the generating unit being adapted for:

creating for each entity of the plurality of entities, using the data, at least one of an entity description documenting the entity, an interconnection description documenting the interconnection to another entity and a data flow description documenting the data flow to and from another entity; and storing the at least one created description for each entity in the storage medium of the computer system.

27. The computer readable program product of claim 26, wherein the at least one retrieving component is adapted for retrieving data from the created descriptions.

28. The computer readable program product of claim 25, wherein the database comprises at least one of a hierarchical and a relational database.

29. The computer readable program product of claim 25, wherein the plurality of entities defines a relational schema.

* * * * *